United States Patent [19]
Hata et al.

[11] Patent Number: 5,271,093
[45] Date of Patent: Dec. 14, 1993

[54] VIDEO DISPLAY APPARATUS FOR FILLING THE INTERIOR SHAPES OF CONTOUR

[75] Inventors: Toshihiko Hata; Kaoru Horiuchi; Toshiharu Nozawa; Satoru Tomita, all of Hyogo, Japan

[73] Assignee: Mitsubishi Denki Kabushiki Kaisha, Tokyo, Japan

[21] Appl. No.: 597,226

[22] Filed: Oct. 15, 1990

[30] Foreign Application Priority Data

| Oct. 17, 1989 | [JP] | Japan | 1-269516 |
| Oct. 17, 1989 | [JP] | Japan | 1-269517 |
| Oct. 17, 1989 | [JP] | Japan | 1-269518 |
| Oct. 17, 1989 | [JP] | Japan | 1-269519 |
| Jun. 27, 1990 | [JP] | Japan | 2-169535 |

[51] Int. Cl.$^5$ ............................................. G06F 15/62
[52] U.S. Cl. ................................. 395/120; 395/125; 395/126; 395/162
[58] Field of Search ............... 395/120, 125–129, 395/133, 135, 150, 162, 164

[56] References Cited

U.S. PATENT DOCUMENTS 4,837,447  6/1989  Pierce et al. ............... 395/164 X
4,887,228  12/1989 Robert ........................ 395/129
5,146,554  9/1992  Statt .......................... 395/150

OTHER PUBLICATIONS

B. D. Ackland et al., "The Edge Flag Algorithm—A Fill Method for Raster Scan Displays", IEEE Transactions on Computers, vol. C-30, No. 1, Jan. 1981.

*Primary Examiner*—Heather R. Herndon
*Assistant Examiner*—Almis Jankus
*Attorney, Agent, or Firm*—Rothwell, Fig, Ernst & Kurz

[57] ABSTRACT

A contour filling apparatus comprising a display frame memory and a draft memory spatially corresponding thereto. A target shape to be displayed is filled inside by a draft filling means according to a suitable draft scan pattern. The filled shape is drawn in the draft memory. Scan coordinates specifying each dot in the draft memory and the display frame memory are generated in accordance with any of a plurality of previously provided scan patterns. If a dot specified by scan coordinates in the draft memory is found to be a dot filled by the draft filling means, that dot is drawn in the display frame memory where specified by the scan coordinates. The target shape is thus filled on a display screen of the apparatus in a desired scan pattern.

8 Claims, 45 Drawing Sheets

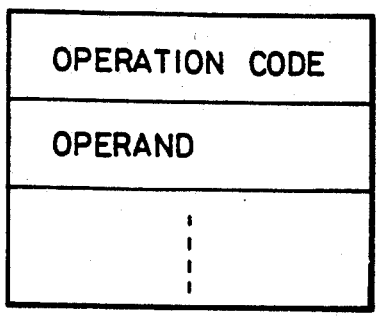
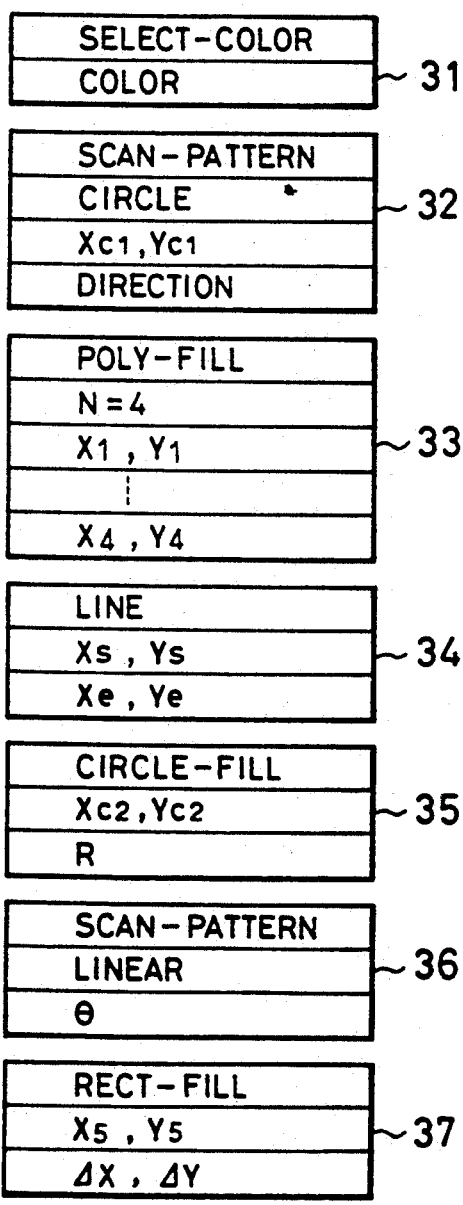
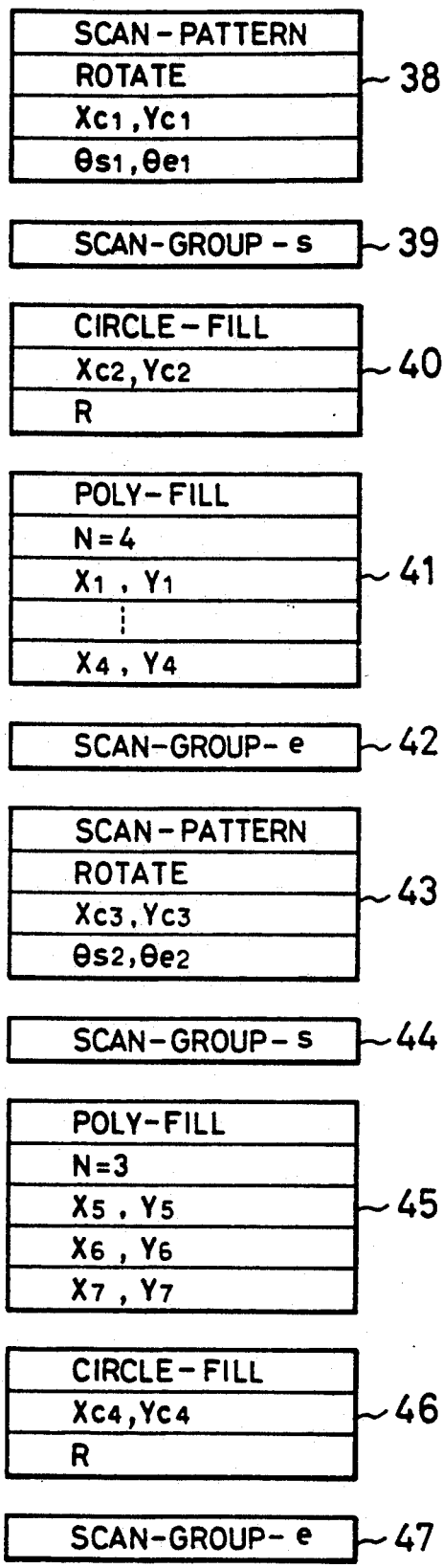

A SHAPE IS FILLED IN THE DRAFT MEMORY.

SCAN COORDINATES OF SCAN LINES (CIRCULAR) ARE GENERATED. A CHECK IS MADE TO SEE IF EACH POINT IS A POINT THAT HAS BEEN FILLED.

THE SHAPE IS DRAWN CONCURRENTLY IN THE DISPLAY FRAME MEMORY

FIG. 7(c)
SCAN COORDINATES OF SCAN LINES (CIRCULAR) ARE GENERATED. A CHECK IS MADE TO SEE IF EACH POINT IS A POINT THAT HAS BEEN FILLED. THE FILLING TAKES PLACE (IN THE DISPLAY FRAME MEMORY) WITH CIRCLES DRAWN FROM AND AROUND CENTER TOWARD CONTOUR OF THE SHAPE.
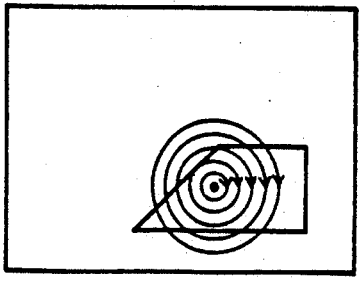 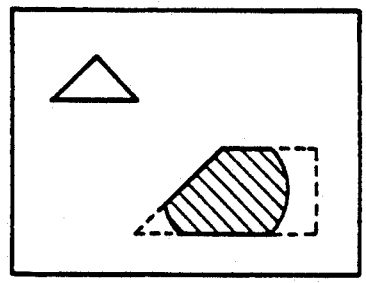
FIG. 7(d)
FILLING OF THE SHAPE IS COMPLETED.
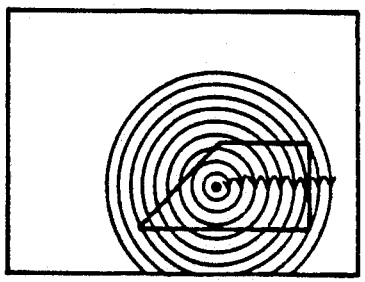 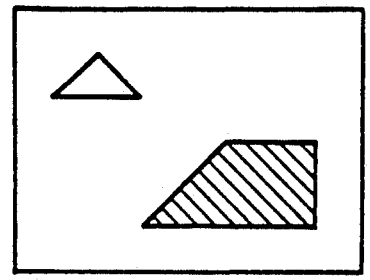

FIG. 7
(e) DRAWING OF STRAIGHT LINES.
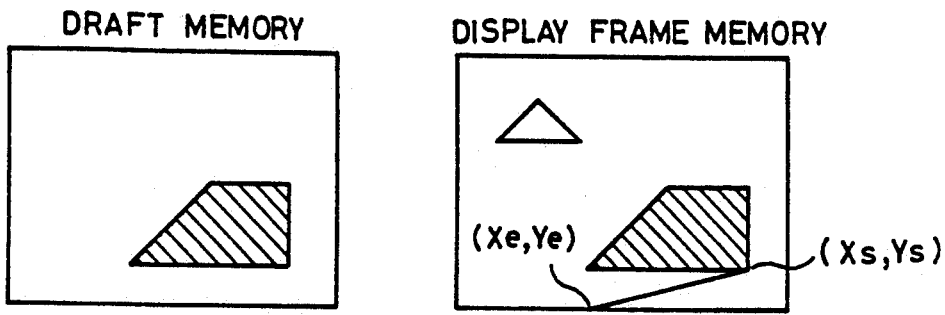
(f) THE SHAPE IS FILLED IN THE DRAFT MEMORY. (THE DRAFT MEMORY IS CLEARED BEFORE A CONTOUR IS DRAWN.)
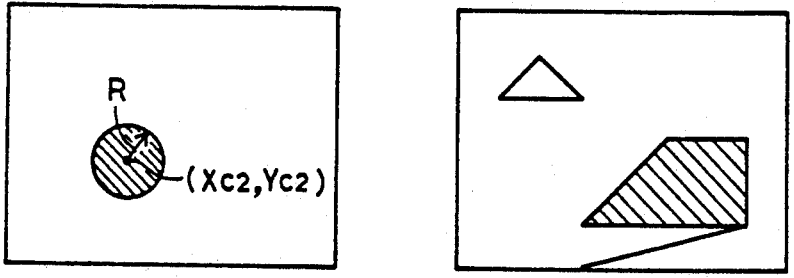
(g) SCAN COORDINATES OF SCAN LINES (CIRCULAR) ARE GENERATED AND CHECKED. THE SHAPE IS DRAWN CONCURRENTLY IN THE DISPLAY FRAME MEMORY.
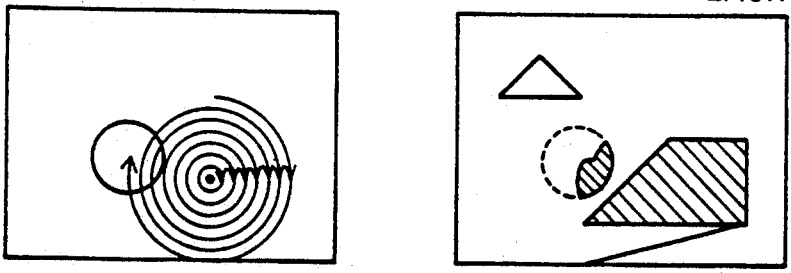
(h) FILLING OF THE SHAPE IS COMPLETED.
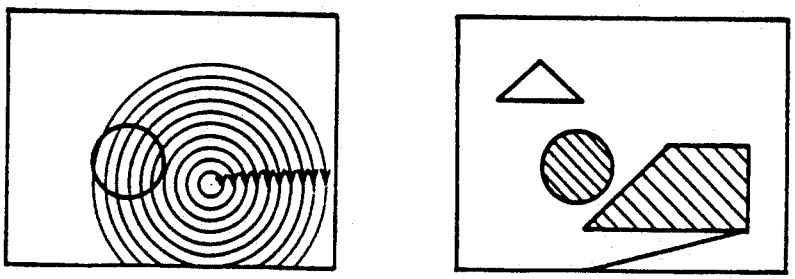

(i) THE DRAFT MEMORY IS CLEARED BEFORE A TWO-DIMENSIONAL SHAPE IS DRAWN THEREIN.

(j) SCAN COORDINATES OF SCAN LINES (OBLIQUE STRAIGHT LINES) ARE GENERATED AND CHECKED. THE SHAPE IS DRAWN CONCURRENTLY IN THE DISPLAY FRAME MEMORY.

(k) FILLING OF THE SHAPE IS COMPLETED

FIG. 9(a)
A PLURALITY OF SHAPES ARE FILLED IN THE DRAFT MEMORY
DRAFT MEMORY               DISPLAY FRAME MEMORY
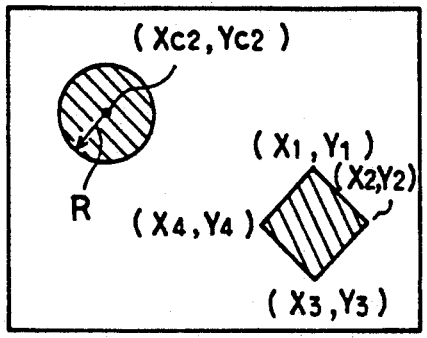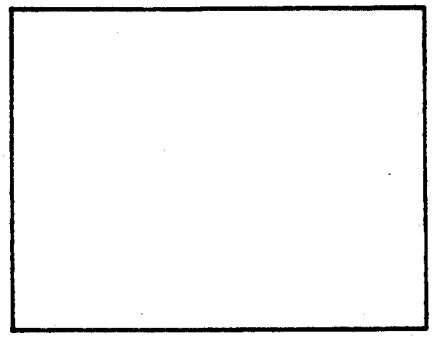
FIG. 9(b)
SCAN COORDINATES OF SCAN LINES (IN ROTATING PATTERN) ARE GENERATED AND CHECKED. THE SHAPES ARE DRAWN CONCURRENTLY IN THE DISPLAY FRAME MEMORY
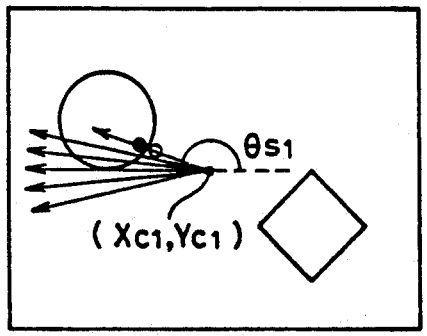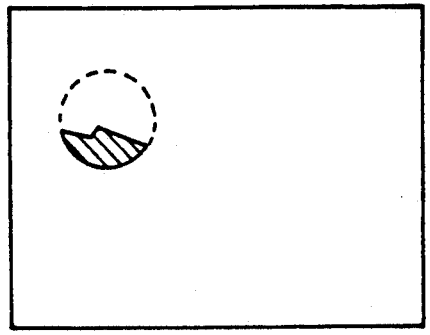

FIG. 9 (c)
SCAN COORDINATES OF SCAN LINES (IN ROTATING PATTERN) ARE GENERATED AND CHECKED. THE SHAPES ARE DRAWN CONCURRENTLY IN THE DISPLAY FRAME MEMORY
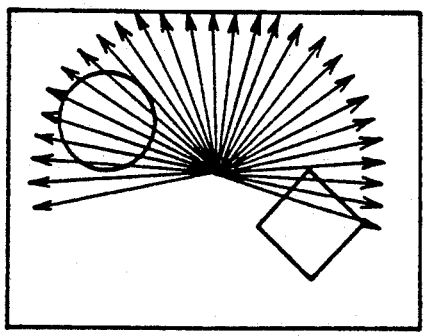 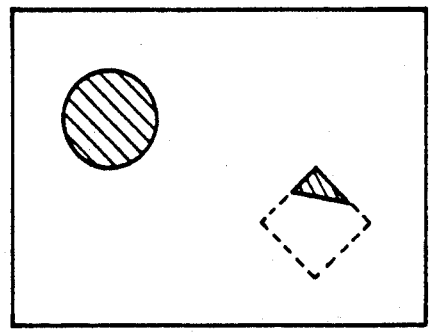
FIG. 9 (d)
FILLING OF THE MULTIPLE SHAPES IS COMPLETED
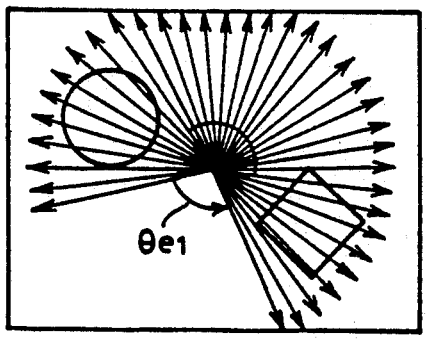 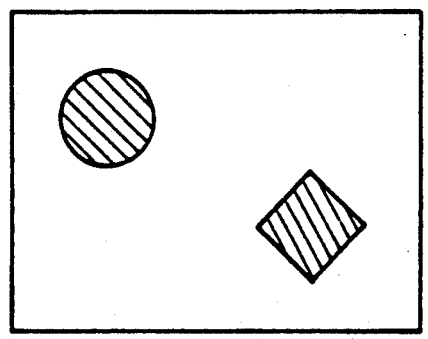

FIG. 9(e)
A PLURALITY OF SHAPES ARE FILLED IN THE DRAFT MEMORY.
DRAFT MEMORY
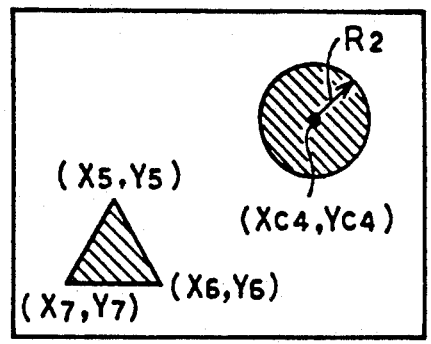
DISPLAY FRAME MEMORY
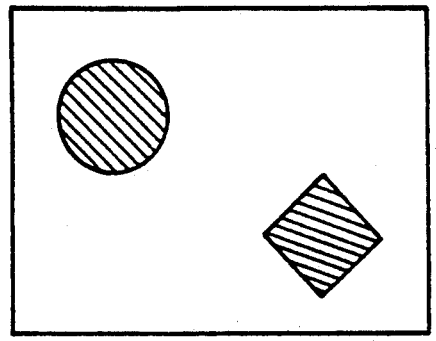
FIG. 9(f)
SCAN COORDINATES OF SCAN LINES (IN ROTATING PATTERN) ARE GENERATED AND CHECKED. THE SHAPES ARE DRAWN CONCURRENTLY IN THE DISPLAY FRAME MEMORY.
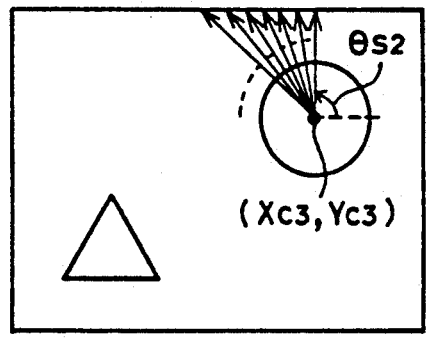
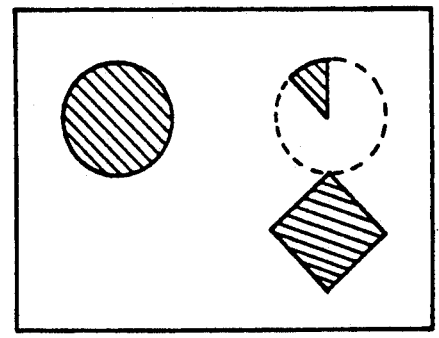

FIG. 9(g)
SCAN COORDINATES OF SCAN LINES (IN ROTATING PATTERN) ARE GENERATED AND CHECKED. THE SHAPES ARE DRAWN CONCURRENTLY IN THE DISPLAY FRAME MEMORY.
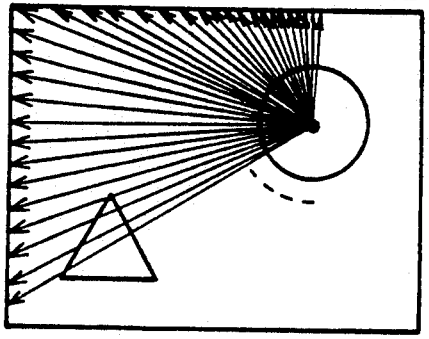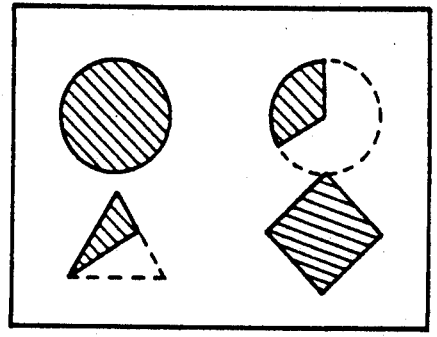
FIG. 9(h)
FILLING OF THE MULTIPLE SHAPES IS COMPLETED.
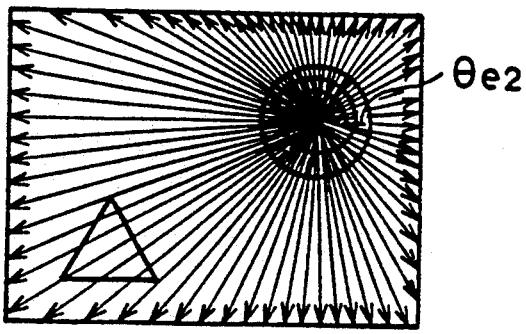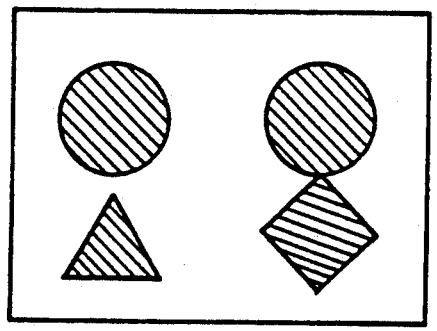

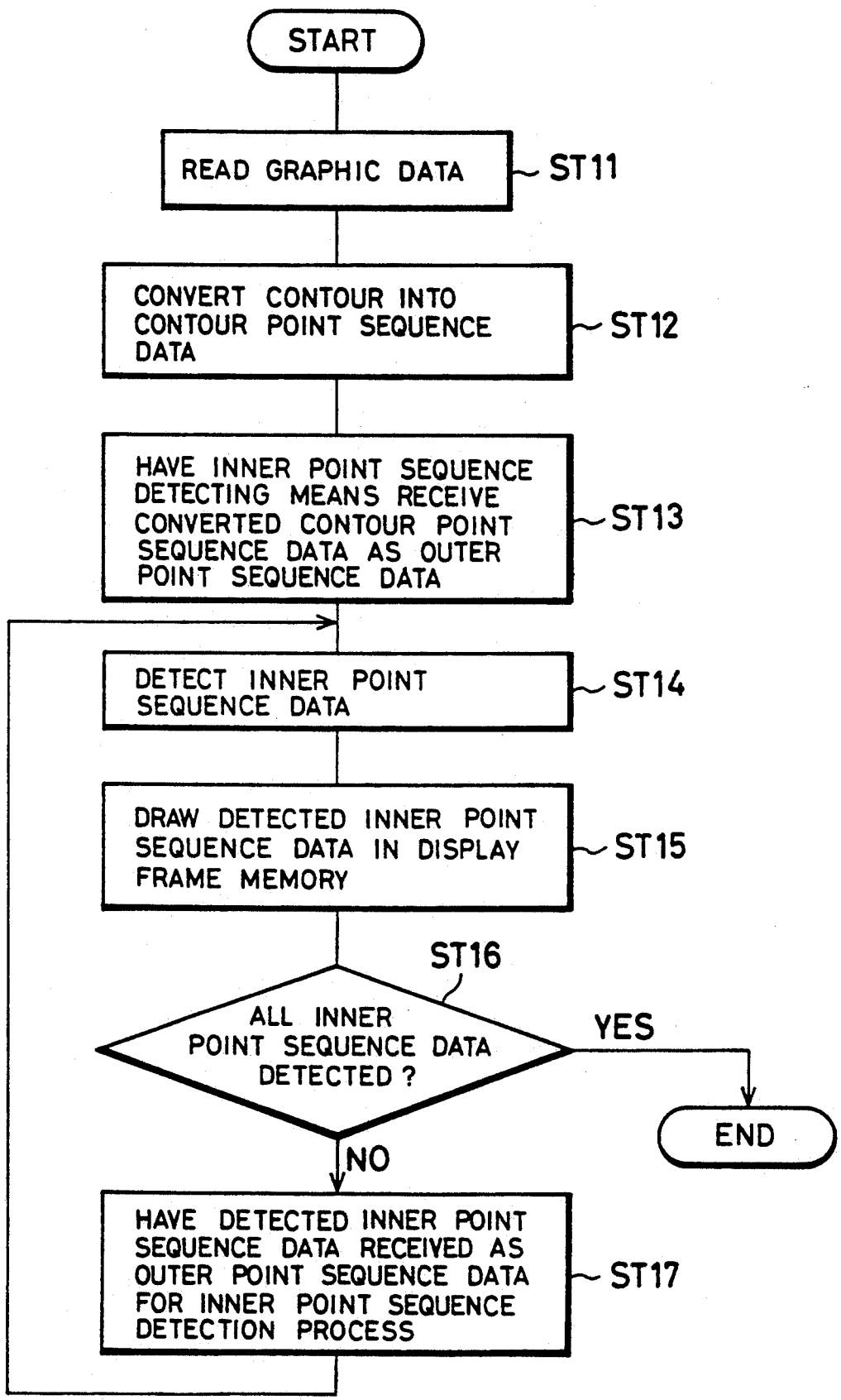

FIG. 15
(a) CLOSED CONTOUR POINT SEQUENCE DATA.
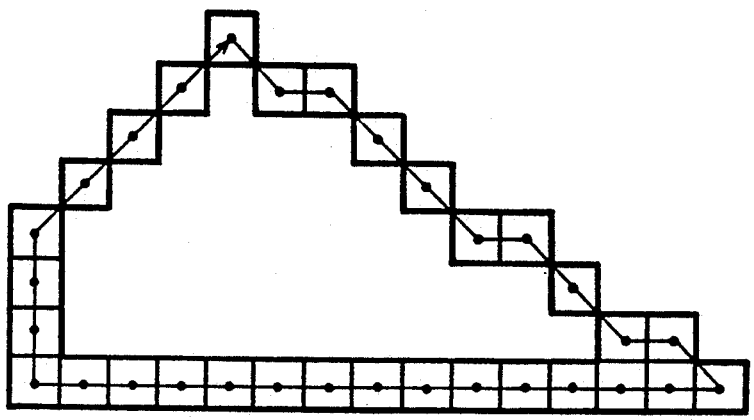
(b) INNER POINT SEQUENCE DATA STARTS TO BE DETECTED THROUGH 3 x 3 MASK.
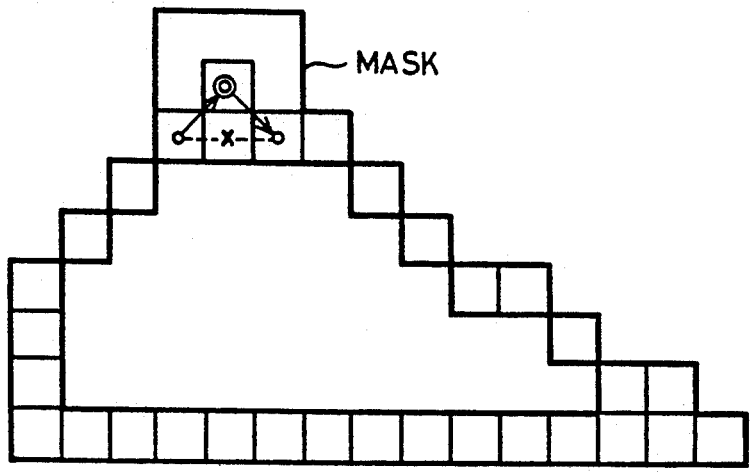
(c) THE MASK IS SHIFTED BY ONE POINT FROM THE POSITION SHOWN IN (b) ABOVE
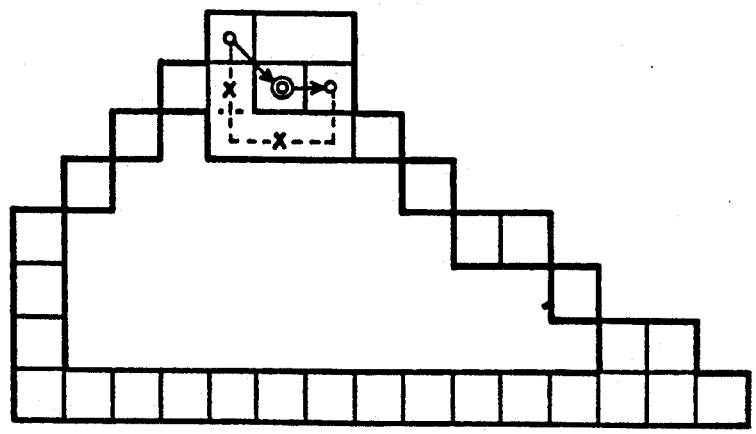

FIG. 15 (d) THE MASK IS SHIFTED BY ANOTHER POINT FROM THE POSITION SHOWN IN (c) ABOVE.
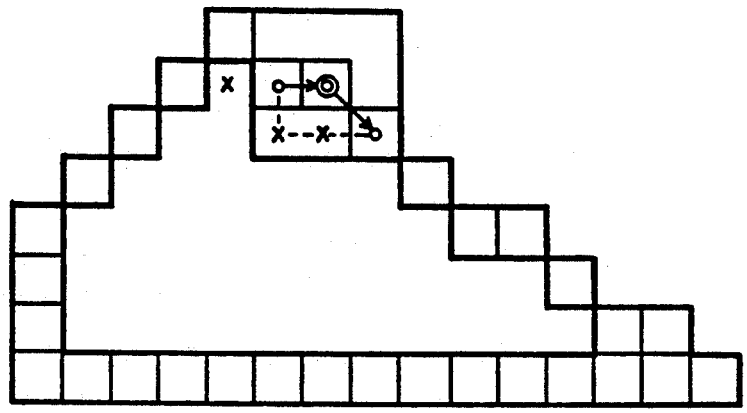
FIG. 15 (e) THE MASK IS SHIFTED BY ANOTHER POINT FROM THE POSITION SHOWN IN (d) ABOVE.
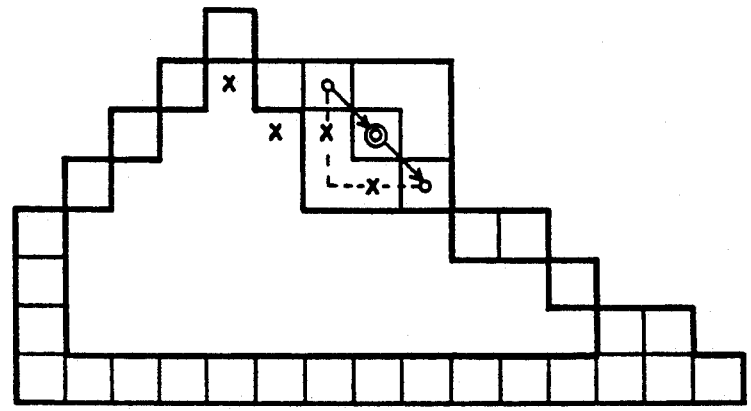
FIG. 15 (f) A CASE IN WHICH UNNECESSARY OUTER POINT SEQUENCE DATA EXISTS.
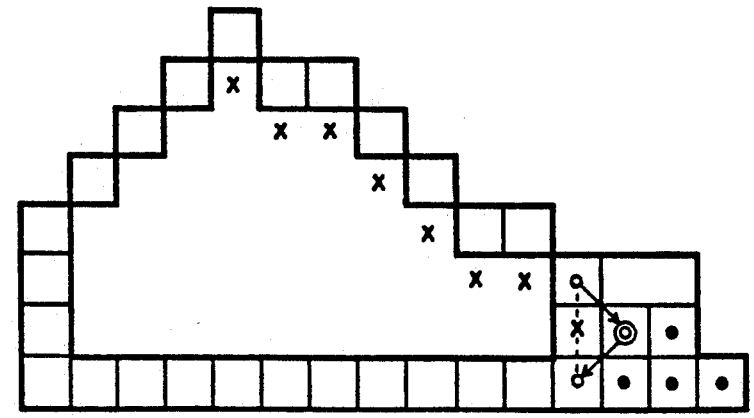

(g) THE MASK IS SHIFTED BY ANOTHER POINT FROM THE POSITION SHOWN IN (f) ABOVE.

(h) DETECTION OF INNER POINT SEQUENCE DATA IS COMPLETED.

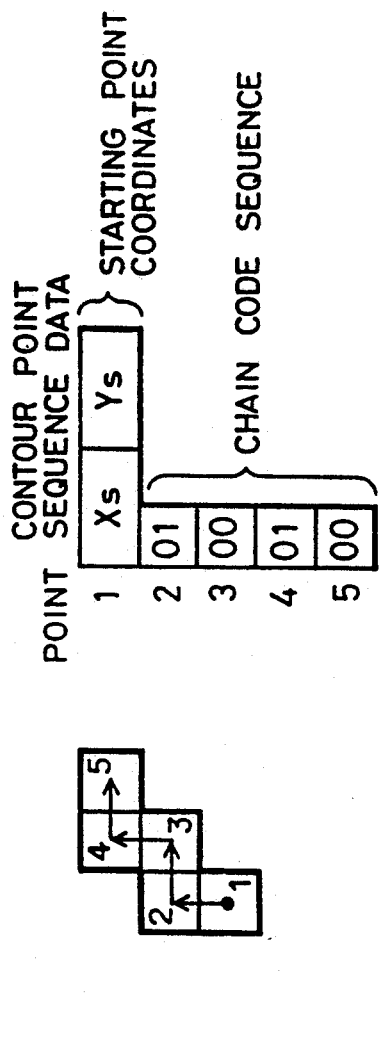
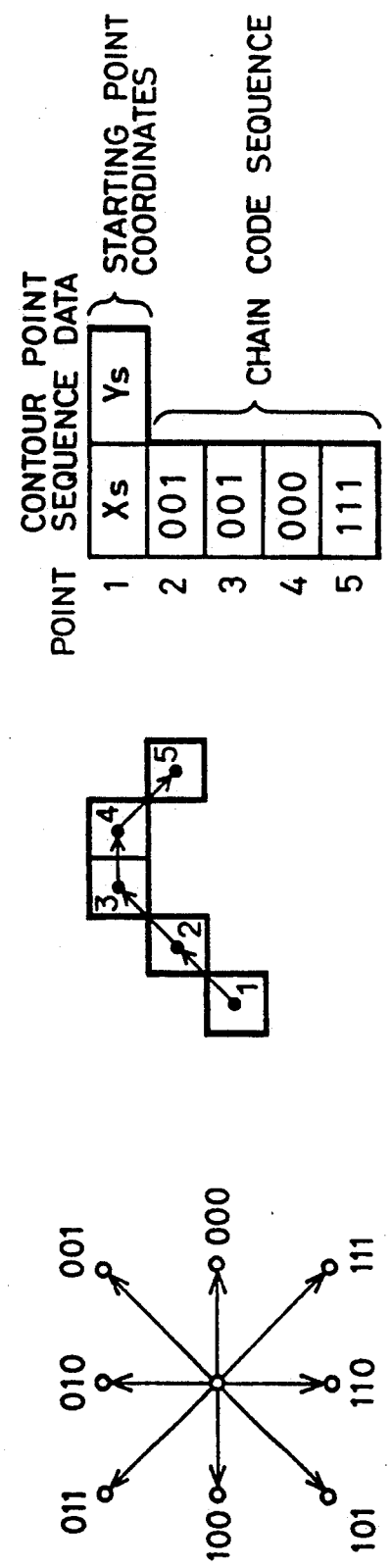
FIG. 16 (a)
FIG. 16 (b)

(a)

(b)

(a) OUTER POINT SEQUENCE HAVING PARTING POINT.

(b) THE OUTER POINT SEQUENCE IS DRAWN IN THE DRAFT MEMORY WHILE A CHECK IS BEING MADE WITH THE MASK

(c) UNNECESSARY OUTER POINTS ARE REMOVED.

REMOVAL OF UNNECESSARY OUTER POINT.

UNNECESSARY OUTER POINT

DETECTION OF OUTER PARTING POINT.

OUTER PARTING POINT

DIRECTION OF OUTER POINT DETECTION (IN THIS EXAMPLE, THE OUTER POINT SEQUENCE IS ARRANGED CLOCKWISE, AND THE DIRECTION INSIDE THE MASK IS COUNTERCLOCKWISE.)

THE INNER POINT SEQUENCE DATA AT A PARTING POINT STARTS TO BE DETECTED.

DIRECTION OF INNER POINT SEQUENCE DETECTION (IN THIS EXAMPLE, THE OUTER POINT SEQUENCE DATA IS ARRANGED COUNTERCLOCKWISE, THE DIRECTION INSIDE THE MASK IS CLOCKWISE, AND THE INNER POINT SEQUENCE DATA TO BE DETECTED IS COUNTERCLOCKWISE.)

(g) DETECTION OF THE INNER POINT SEQUENCE DATA IS COMPLETED.

(h) DRAWING OF THE OUTER POINT SEQUENCE IS RESUMED, AND UNNECESSARY OUTER POINTS ARE REMOVED.

(i) REMOVAL OF UNNECESSARY OUTER POINT. (ANY OUTER POINT CAUSING THE PARTING OF THE INNER POINT SEQUENCE IS REMOVED.)

(j) DRAWING OF OUTER POINT SEQUENCE

(k) DETECTION OF OUTER PARTING POINT

OUTER PARTING POINT

DIRECTION OF PARTING POINT DETECTION (l) INNER POINT SEQUENCE DATA STARTS TO BE DETECTED.

DIRECTION OF DETECTING INNER POINT SEQUENCE DATA (m) DETECTION OF THE INNER POINT SEQUENCE DATA IS COMPLETED.

X : DETECTED INNER POINT SEQUENCE DATA

FIG. 21 (n)

DRAWING OF THE OUTER POINT SEQUENCE IS RESUMED, AND UNNECESSARY OUTER POINTS ARE REMOVED.

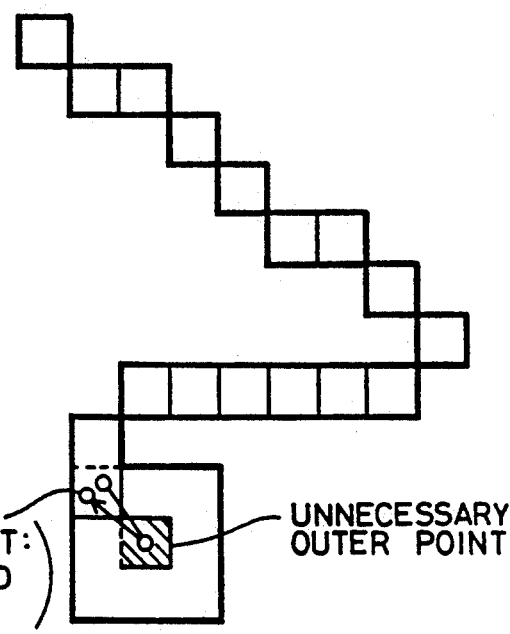

(UNNECESSARY OUTER POINT: ONE OF THE TWO OVERLAID POINTS IS LEFT INTACT.)

UNNECESSARY OUTER POINT

FIG. 21 (o)

REMOVAL OF UNNECESSARY OUTER POINT.
(ANY OUTER POINT CAUSING THE PARTING OF THE INNER POINT SEQUENCE DATA IS REMOVED.)

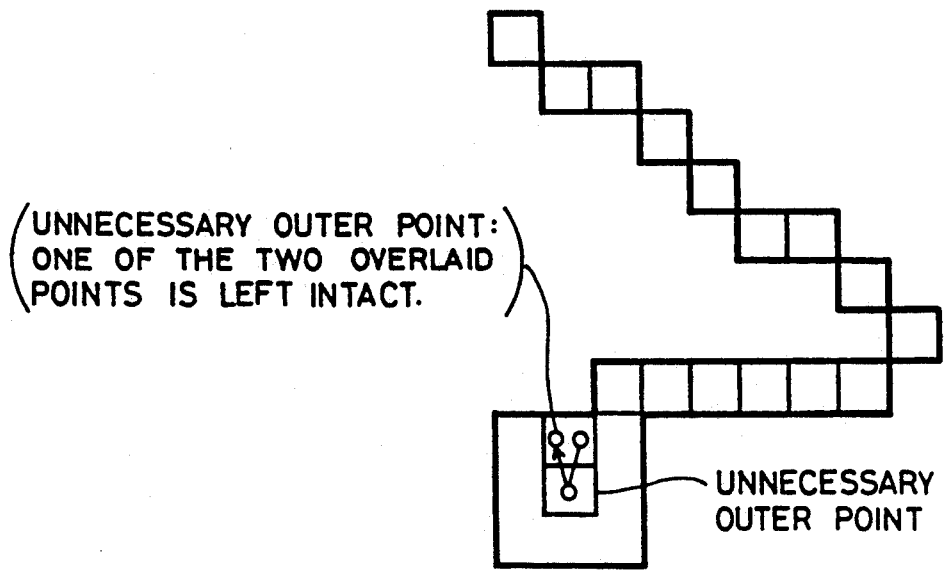

(UNNECESSARY OUTER POINT: ONE OF THE TWO OVERLAID POINTS IS LEFT INTACT.)

UNNECESSARY OUTER POINT (p) DRAWING OF POINTER POINT SEQUENCE.

(q) DETECTION OF OUTER PARTING POINT.

(r) THE PROCESS OF DETECTING ALL INNER POINT SEQUENCE DATA HAS COME TO AN END.

X: DETECTED INNER POINT SEQUENCE DATA

FIG. 22
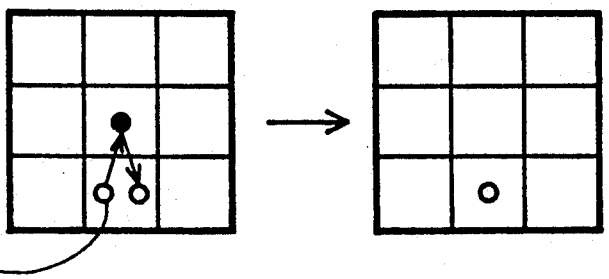
TWO OUTER CONTOUR POINTS ARE OVERLAID ON ONE PIXEL.
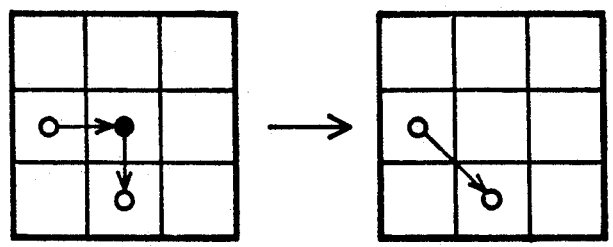
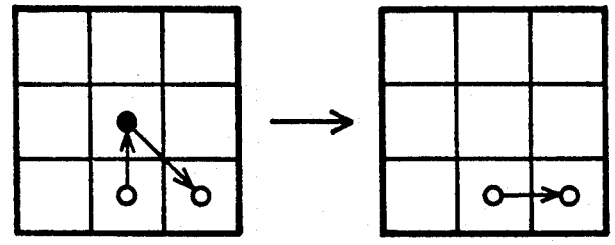
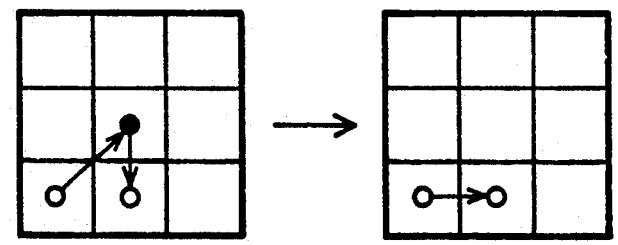
BEFORE REMOVAL
AFTER REMOVAL
● : UNNECESSARY OUTER POINT TO BE REMOVED

VIDEO DISPLAY APPARATUS FOR FILLING THE INTERIOR SHAPES OF CONTOUR

BACKGROUND OF THE INVENTION

1. Field of the Invention

The present invention relates to a contour filling apparatus and, more particularly, to an apparatus for filling the interior of shapes displayed on a display device.

2. Prior Art

FIG. 36 is a block diagram of a prior art contour filling apparatus illustratively disclosed in Japanese Patent Laid-open No. 56-142585. In FIG. 36, a display device 1 displays a target shape; a display frame memory 2 stores in bit-map format the shape to be displayed on the display device 1; and a display controller 3 controls the drawing in the display frame memory 2.

How the above prior art contour filling apparatus works will now be described. FIG. 37 is a view depicting how the interior of a shape is filled by the apparatus. In FIG. 37, reference numeral 4 is the contour of the shape to be displayed, and 5 is a scan starting point inside the contour 4.

The contour 4 of the shape to be displayed on the display device 1 is drawn in the display frame memory 2. The display device 1 displays the contour 4 based on the contents of the display frame memory 2. From the starting point 5 of a given line inside the contour 4, the display controller 3 starts scanning illustratively in the positive direction of the X axis. While performing the scan, the display controller 3 fills the applicable dots one by one in the display frame memory 2, until the contour 4 is reached. On detecting the contour 4, the display controller 3 returns to the starting point 5. From there, the display controller 3 similarly performs a scan in the negative direction of the X axis and fills the applicable points one by one. When the current line has been filled, the display controller 3 goes to another starting point 5 which is illustratively located one point away in the positive direction of the Y axis. Then the same process is repeated so as to fill the applicable dots of the line.

When the current starting point 5 has reached the contour 4, the display controller 3 returns to the initial starting point and performs the same process in the negative direction of the Y axis, shifting one point per scan. If there remains a portion yet to be filed after the lines in the negative direction of the Y axis have been filled, a scan starting point 5 is set anew in the interior of that portion, and the same process is again carried out. The interior of the contour 4 displayed on the display device 1 is filled consecutively in keeping with the filling in the display frame memory 2.

The prior art contour filling apparatus of the above-described construction emphasizes high-speed filling and draft memory reductions. One disadvantage of this apparatus is that because shapes are filled in a scan pattern (e.g., horizontal direction) specific to the apparatus, the filling process is executed only in a uniform manner.

SUMMARY OF THE INVENTION

It is therefore an object of the present invention to provide a contour filling apparatus capable of executing the contour filling process in a variety of manners based on any of a plurality of scan patterns previously stored in the apparatus.

It is another object of the present invention to provide a contour filling apparatus capable of displaying the filling process moving from the contour of a shape to be displayed toward the interior thereof, the apparatus being further capable of displaying the filling process from the center of the shape toward the contour thereof.

It is a further object of the present invention to provide a contour filling apparatus capable of displaying the filling process along scan lines that rotate around the center of a shape to be displayed.

According to a first aspect of the invention, there is provided a contour filling apparatus having a drawing controller which comprises: a display frame memory; a draft memory spatially corresponding to the display frame memory; a draft filling means for drawing a two-dimensional shape in the draft memory; a scan coordinate generating means for generating scan coordinates that specify a bit position in the draft memory and the display frame memory based on a scan pattern selected from a plurality of previously provided scan patterns; a scan coordinate determining means for determining whether that dot in the draft memory which is specified by the scan coordinates generated by the scan coordinate generating means is a dot that has been filled by the draft filling means; and a dot drawing means for drawing the dot specified by scan coordinates in the display frame memory if the dot specified by the same scan coordinates in the draft memory is found to be filled.

According to a second aspect of the invention, there is provided a contour filling apparatus having a drawing controller which comprises: a point sequence converting means for converting the contour of a shape to be displayed on a display device into closed contour point sequence data; an inner point sequence detecting means for admitting as outer point sequence data any of the contour point sequence data and the inner point sequence data detected by the detecting means, the detecting means consecutively detecting the inner point sequence data in contact with the interior of the outer point sequence data; and a point sequence drawing means for drawing in the display frame memory the inner point sequence data detected by the inner point sequence detecting means.

According to a third aspect of the invention, there is provided a contour filling apparatus having the drawing controller defined in the second aspect of the invention, the controller further comprising: a parting point detecting means for detecting a point which parts the inner point sequence data detected by the inner point sequence detecting means; and a point sequence part connecting means for connecting opened inner point sequence data parted by at least one parting point into a plurality of closed inner point sequence data.

According to a fourth aspect of the invention, there is provided a contour filling apparatus having the drawing controller defined in the second aspect of the invention, the controller further comprising: an inner point sequence storing means for consecutively storing inner point sequence data detected by the inner point sequence detecting means; and an inner point sequence reading means for consecutively reading the inner point sequence data stored in the inner point sequence storing means, the data being read from center to contour of the shape to be displayed; wherein the inner point sequence data is drawn in the display frame memory in the order in which the data was read out.

According to a fifth aspect of the invention, there is provided a contour filling apparatus having the drawing controller defined in the fourth aspect of the invention, the controlling further comprising: a parting point detecting means for detecting a point which parts the inner point sequence data detected by the inner point sequence detecting means; and a point sequence part connecting means for connecting opened inner point sequence data parted by at least one parting point into a plurality of closed inner point sequence data.

According to a sixth aspect of the invention, there is provided a contour filling apparatus having a drawing controller which comprises: a contour point sequence generating means for consecutively generating coordinates of each of the points constituting the contour of a shape to be displayed; and a straight line drawing means for drawing in the display frame memory a digital straight line quantized with a predetermined algorithm, the straight line connecting the coordinates of the current contour point with the coordinates of the center around which scan lines rotate inside the shape to be displayed.

According to a seventh aspect of the invention, there is provided a contour filling apparatus wherein the contour point sequence generating means generates the coordinates of each contour point in a contour point sequence by use of four adjacently connected points, and the straight line drawing means draws a digital straight line using eight adjacently connected points.

According to an eighth aspect of the invention, there is provided a contour filling apparatus wherein the contour point sequence generating means generates the coordinates of each contour point in a contour point sequence by use of eight adjacently connected points, and the straight line drawing means draws a digital straight line using four adjacently connected points.

The above and other related objects and features of the invention, as well as the novelty thereof, will clearly appear from the following description and from the accompanying drawings.

BRIEF DESCRIPTION OF THE DRAWINGS

FIG. 3 is a view depicting the make-up of a graphic command constituting graphic data;

FIG. 4 is a view illustrating a series of graphic commands for filling a single shape;

FIG. 8 is a view showing a series of graphic commands for filling a plurality of shapes at one time;

FIGS. 9(a-h) are views depicting how the filling process is executed by the commands of FIG. 8;

FIG. 13 is a flowchart showing how the second embodiment of FIG. 12 works;

FIGS. 16(a-b) are views describing chain codes;

FIG. 22 is a view depicting how unnecessary outer point sequence data is removed through a mask;

PREFERRED EMBODIMENT OF THE INVENTION

Figure 1:
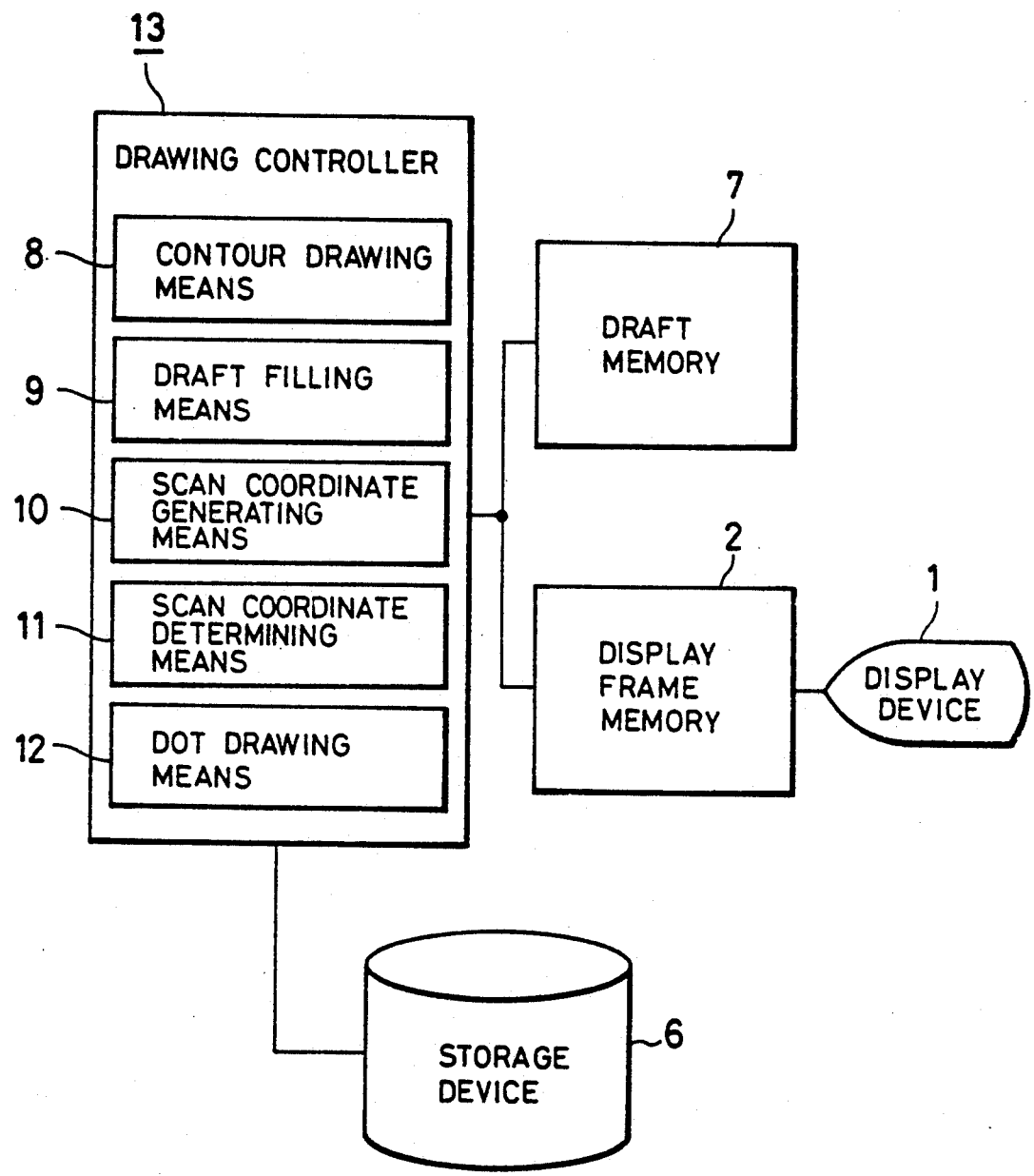
FIG. 1 is a block diagram of a contour filling apparatus practiced as a first embodiment of the present invention.
Figure 36:
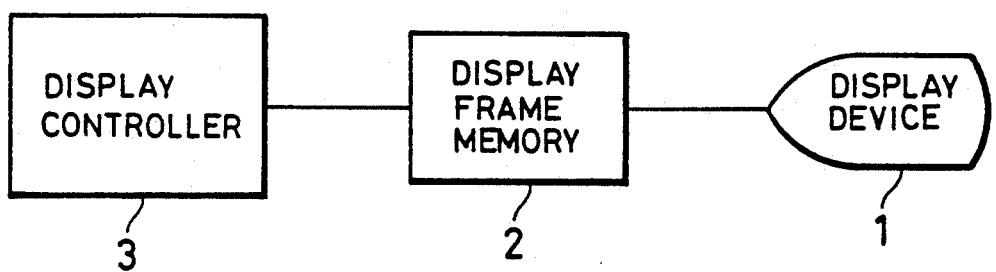
FIG. 36 is a block diagram of the typical prior art contour filling apparatus.
Figure 37:
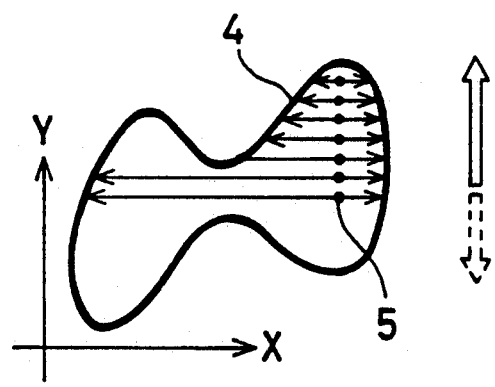
FIG. 37 is a view showing how the prior art contour filling apparatus works.

Preferred embodiments of the invention will now be described with reference to the accompanying drawings. FIG. 1 is a block diagram of the first embodiment of the invention. In FIG. 1, reference numeral 1 is a display device; 2 is a display frame memory identical or equivalent to the part designated by the same reference numeral in FIG. 36; 6 is a storage device that stores graphic data of a shape to be displayed on the display device 1; and 7 is a draft memory spatially corresponding to the display frame memory 2. That is, the draft memory 7 has a bit-by-bit correspondence with the shape to be displayed.

Referring further to FIG. 1, reference numeral 8 is a contour drawing means for drawing in the draft memory 7 the contour of the shape to be displayed by use of the graphic data read from the storage device 6. Numeral 9 is a draft filling means for filling each of the dots inside the contour drawn in the draft memory 7 according to a predetermined draft scan pattern, thereby drawing a two-dimensional shape in the draft memory 7. Numeral 10 is a scan coordinate generating means for generating scan coordinates that specify dot positions in the draft memory 7 and the display frame memory 2 based on a scan pattern selected from among a plurality of previously provided scan patterns. Numeral 11 is a scan coordinate determining means for determining whether that dot in the draft memory 7 which is specified by the scan coordinates generated by the scan coordinate generating means 10 is a dot which has been filled by the draft filling means 9 and which fails inside the target shape. Numeral 12 is a dot drawing means for drawing the dot specified by scan coordinates in the display frame memory 2 if the dot specified by the same scan coordinates in the draft memory 7 is found to be a dot inside the target shape.

In FIG. 1, reference numeral 13 is a drawing controller comprising, illustratively in the form of software, the above-mentioned contour drawing means 8, draft filling means 9, scan coordinate generating means 10, scan coordinate determining means 11 and dot drawing means 12.

Figure 2:
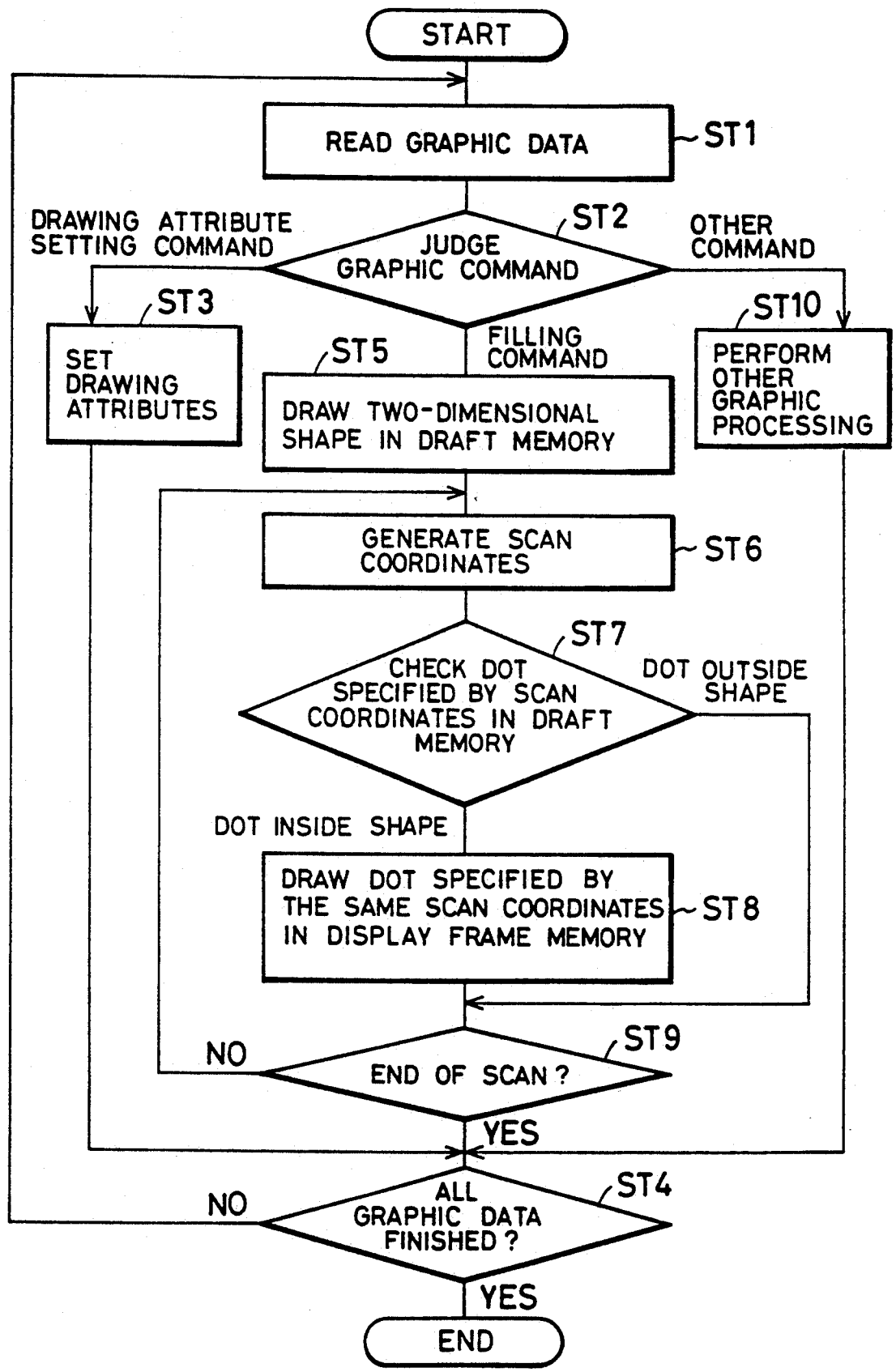
FIG. 2 is a flowchart showing the steps taken by the first embodiment for contour filling.
Figure 5A:
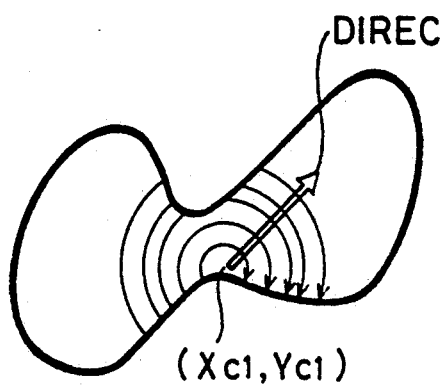
FIGS. 5(-d) are views illustrating typical scan patterns.
Figure 5B:
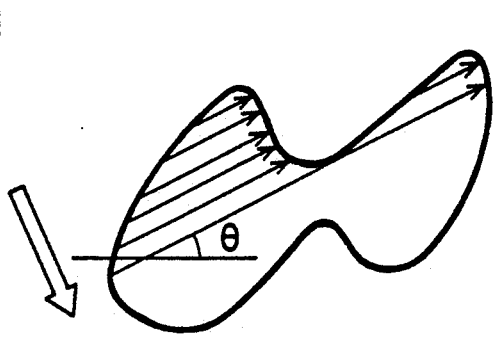
Figure 5C:
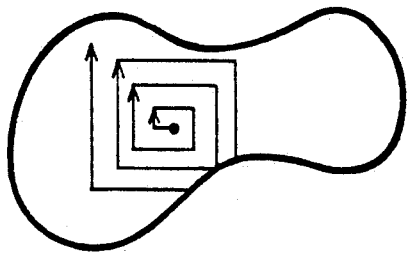
Figure 5D:
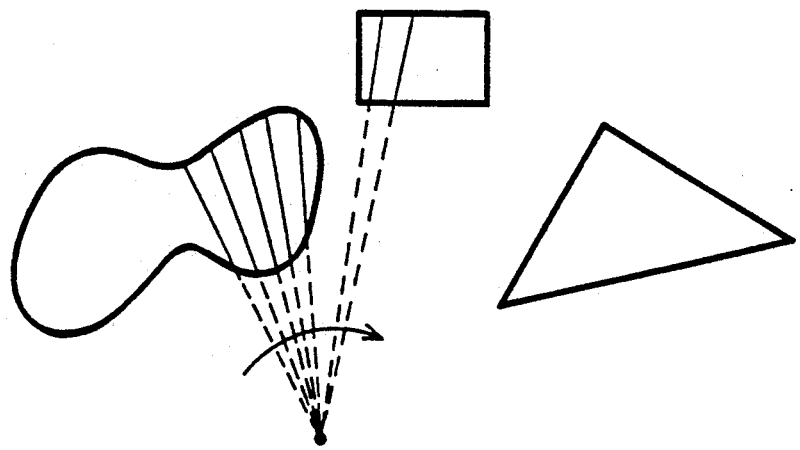

How the first embodiment of FIG. 1 works will now be described with reference to FIG. 2, which is a flowchart showing the filling steps of the embodiment. In step ST1, the drawing controller 13 reads graphic data from the storage device 6. The graphic data is a collection of graphic commands. As shown in FIG. 3, each graphic command is constituted by an operation code that indicates the type of the command and by operands representing the data needed to execute the command. Graphic commands of the above make-up come in two kinds: drawing commands for filling contours, plotting line segments and otherwise drawing shapes; and drawing attribute setting commands for specifying drawing colors, establishing scan patterns and designating other drawing attributes. FIG. 4 illustrates a series of graphic commands that are read out in step ST1.

After being read out, each graphic command is judged for its operation code in step ST2. The graphic command 31 of the graphic data that was read first is judged to be a drawing color specifying command based on its operation code. The drawing controller 13 then goes to step ST3 and establishes as the drawing color the color specified by the operand of the command 31. In step ST4, a check is made to see if all graphic data has been read out. If there still is graphic data to be read out, step ST1 is reached again. The graphic command 32 that is read next is a command that designates scan pattern drawing attributes. In step ST3, a circular scan pattern is established based on the contents of the operands in the command 32, the pattern involving consecutively generating circles around their center $(X_{c1}, Y_{c1})$ in the direction specified by the DIRECTION operand, e.g., from center to contour. The processing returns from step ST4 to step ST1.

FIG. 5 depicts some typical scan patterns. FIG. 5 (A) shows the above-mentioned circular scan pattern. According to the contents of the operands in the graphic command, this circular pattern involves sequentially generating digital concentric circles around their center $(X_{c1}, Y_{c1})$ in the direction specified by the DIRECTION operand, i.e., from center to contour or in reverse. Methods for generating digital circles are known in the art and are not described in this specification.

Figure 6:
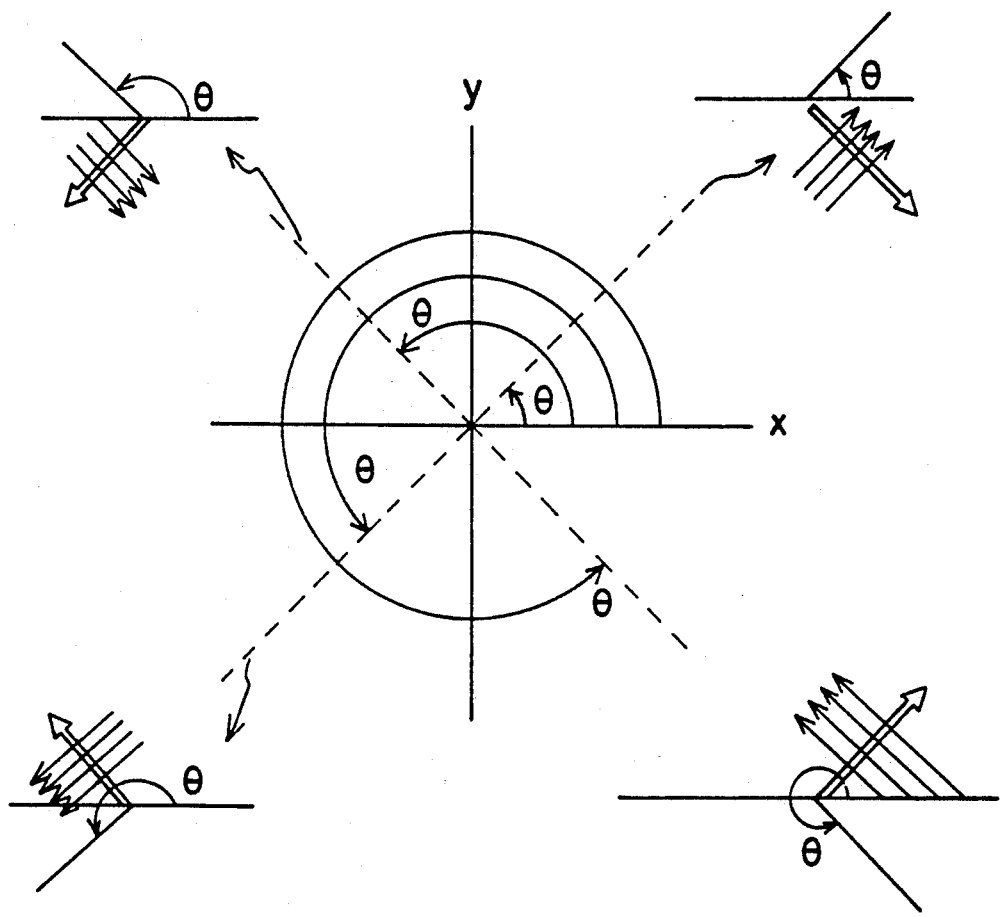
FIG. 6 is a view depicting how scan lines advance by use of oblique lines.

FIG. 5 (B) describes an oblique line scan pattern. The direction of scan lines in the oblique line scan pattern is varied, as shown in FIG. 6, depending on a gradient $\theta$ specified by an operand included in the graphic command. The scan lines progress from upper left to lower right if the gradient $\theta$ is in the first quadrant; from upper right to lower left if the gradient $\theta$ is in the second quadrant; from lower right to upper left if the gradient $\theta$ is in the third quadrant; and from lower left to upper right if the gradient $\theta$ is in the fourth quadrant.

FIGS. 5 (C) and 5 (D) illustrate a rectangular spiral scan pattern and a scan line rotating pattern, respectively. The scan pattern of FIG. 5 (D) is used where a plurality of shapes are scanned concurrently.

Figure 7A:
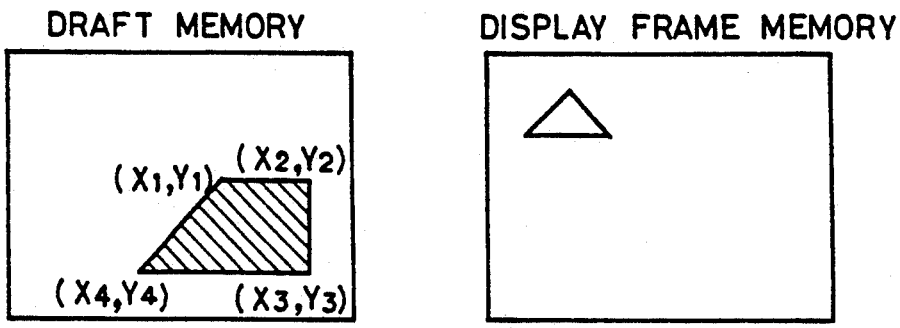
FIGS. 7(a-k) are views showing how a single shape is filled.
Figure 7B:
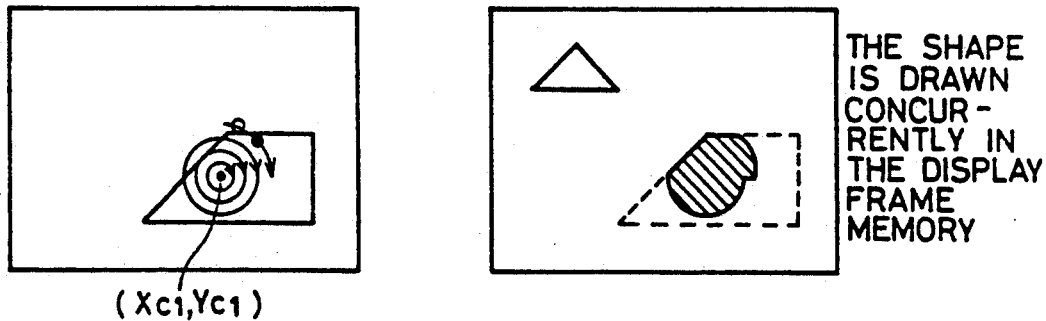
Figure 7:
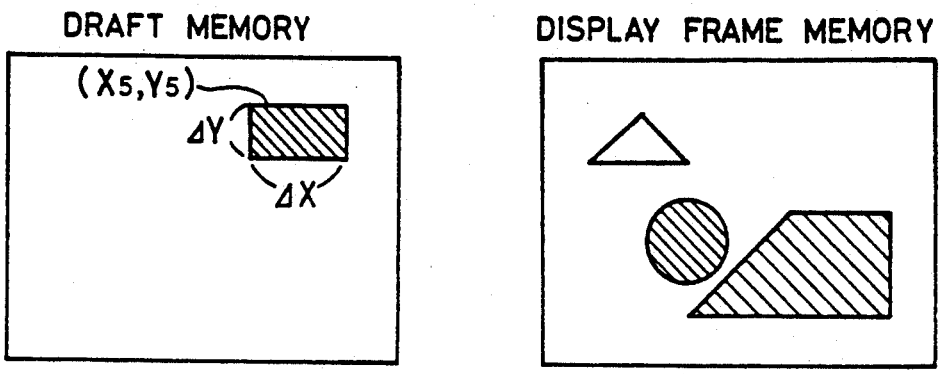
Figure 7:
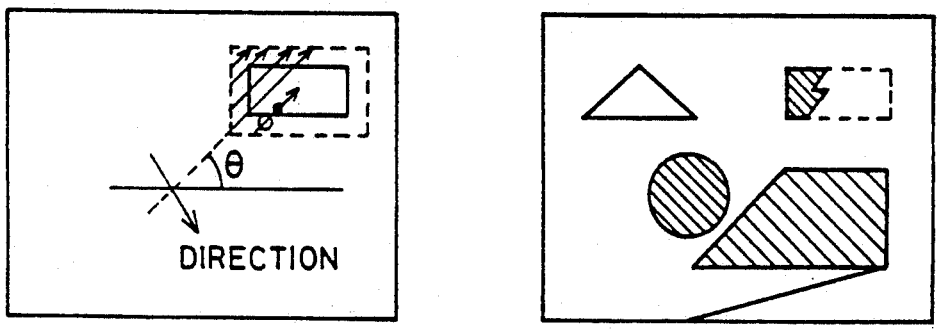
Figure 7:
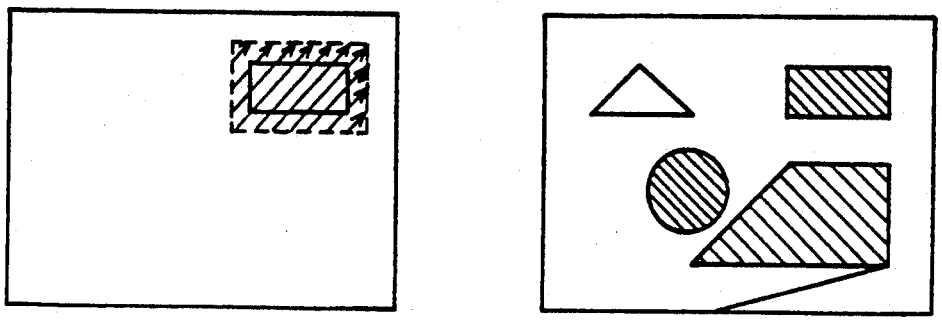

The graphic command 33 that is read out next has an operation code that designates the filling of a polygon (rectangle). Then the processing goes from step ST2 to step ST5. In step ST5, the contour drawing means 8 draws the contour of the polygon (rectangle) specified in the draft memory 7 by writing a "1" to each of the dots constituting the contour, the drawing being performed by use of the polygon vertex coordinates $(X_1, Y_1)$–$(X_4, Y_4)$ specified by the operands. The draft filling means 9 then fills the dots inside the contour by converting each of the "0" dots into "1" in accordance with a selected draft scan pattern (e.g., horizontal scan pattern identical to that in the prior art). The filling produces a two-dimensional shape in the draft memory 7, as depicted in FIG. 7 (A). A triangle included in FIG. 7 (A) is drawn in the display frame memory 2 in a previous process whose description is omitted.

With the drawing of the shape completed, the scan coordinate generating means 10 generates scan coordinates in step ST6. The scan coordinates are generated consecutively according to the circular scan pattern around the center $(X_{c1}, Y_{c1})$ established by the graphic command 32. When generated, these coordinates specify dot positions in the draft memory 7 and the display frame memory 2. In step ST7, the scan coordinate determining means checks to see if the dot specified by the scan coordinates in the draft memory 7 is a dot that falls within the target shape. If the dot in the draft memory 7 is a "1", the dot is considered to be inside the shape (including its contour); if the dot is a "0", the dot is outside thereof.

If the dot specified by the scan coordinates in the draft memory 7 is found to be a dot inside the filled shape, the processing goes to step ST8. In step ST8, the dot drawing means 12 draws the dot specified by the same scan coordinates in the display frame memory 2. That is, the drawing color designating code contained in the graphic command 31 is written to the memory element allocated to the applicable dot in the display frame memory 2. When the drawing of the dot is completed, the processing returns from step ST9 to step ST6. If the dot is not found to be inside the filled shape, the processing goes direct to step ST9.

The above process is repeated until the end of the scanning is detected in step ST9. In this manner, the shape of the polygon (rectangle) specified in the display frame memory 2 is drawn consecutively in accordance with the above-described scan pattern. FIGS. 7 (B)–7 (D) illustrate how the process is carried out.

With the scanning completed, the processing returns from step ST4 to step ST1, and the next graphic command 34 of the graphic data is read out. This graphic command 34 has an operation code that designates the drawing of a straight line. Then the processing goes from step ST2 to step ST10. In step ST10, a straight line is drawn in the display frame memory 2, the line beginning at $(X_s, Y_s)$ and ending at $(X_e, Y_e)$, as illustrated in FIG. 7 (E).

Thereafter, the processing returns from steps ST4 to step ST1. A circle whose center $(X_{c2}, Y_{c2})$ and radius R are specified by the graphic command 35 is drawn in the display frame memory 2 according to the above-described circular scan pattern, the pattern involving generating circles consecutively around the point $(X_{c1}, Y_{c1})$ from center to contour, as depicted in FIGS. 7 (F)–7 (H). It is to be noted that the draft memory 7 is cleared, i.e., every bit thereof is cleared to zero, before a contour is drawn therein by the graphic command 35.

The graphic command 36 that is read out next establishes scan pattern drawing attributes. The operands contained in the command 36 determine an oblique line scan pattern with a gradient $\theta$. When the graphic command 37 is read out next, a rectangle of which one vertex $(X_5, Y_5)$, a width $\Delta X$ and a height $\Delta Y$ are specified by the command 37 is likewise drawn in the display frame memory 2 in accordance with the oblique line scan pattern, as illustrated in FIGS. 7 (I)–7 (K).

When it is found in step ST4 that all graphic data has been read, the processing comes to an end.

Below is a description of how a plurality of shapes are filled concurrently. FIG. 8 shows a series of graphic commands used for the concurrent filling of multiple shapes. The graphic commands 40 and 41 designate shapes which are filled concurrently according to the scan pattern specified by the graphic command 38. That is, a circle with its center at $(X_{c2}, Y_{c2})$ and having a radius $R_1$ and a polygon (rectangle) with its vertexes at $(X_1, Y_1)$–$(X_4-Y_4)$ are filled concurrently with scan lines that rotate around the center $(X_{c1}, Y_{c1})$ from a rotation start angle $\theta_{s1}$ to a rotation end angle $\theta_{e1}$. The multiple shapes to be filled concurrently are grouped by the graphic commands 39 and 42, as depicted in FIGS. 9 (A)–9 (D). The triangle which is grouped by the graphic command 44 and whose vertexes $(X_5, Y_5)$–$(X_7, Y_7)$ are specified by the graphic command 45, and the circle which is grouped by the graphic command 47 and whose center $(X_{c4}, Y_{c4})$ and radius $R_2$ are specified by the graphic command 46, are also filled concurrently according to the scan pattern set by the graphic command 43, as shown in FIGS. 9 (E)–9 (H). The grouping graphic commands 39, 42, 44 and 47 require no operands; they consist of a single operation code each.

Figure 10:
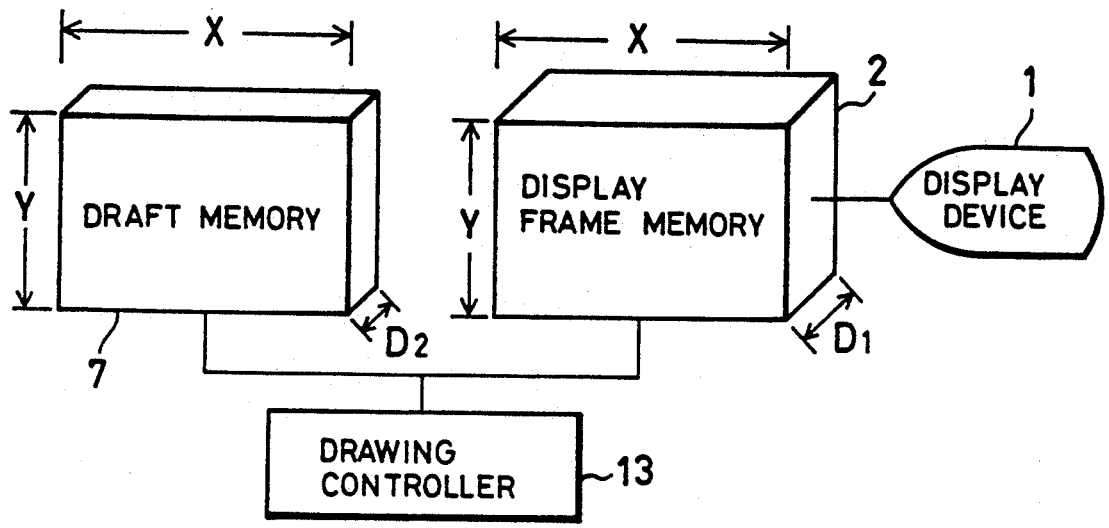
FIG. 10 is a block diagram of a variation of the first embodiment according to the invention.

What follows is a description of a variation of the first embodiment whereby a plurality of shapes are filled concurrently with different colors. FIG. 10 is a block diagram of that variation. In FIG. 10, each dot of the display frame memory 2 is assigned $D_1$ bits, e.g., four bits. It is thus possible to display 16 colors 0–15. Each dot of the draft memory 7 is assigned $D_2$ dots, e.g., two bits. This permits concurrent filling with three colors. If values 0–3 are written to the draft memory 7, these values may provide color codes by which to distinguish the colors used. In this case, the value 0 may be used to indicate the exterior, leaving the values 1–3 to provide concurrent filling with three colors.

Figure 11:
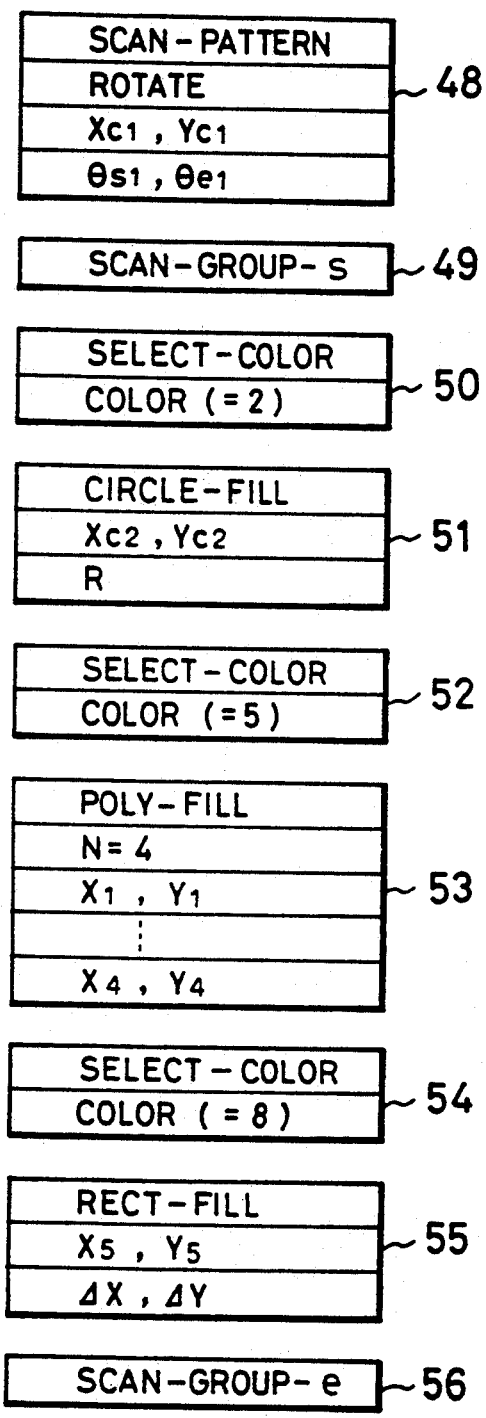
FIG. 11 is a view illustrating a series of graphic commands for use with the variation of FIG. 10.

FIG. 11 describes a series of graphic commands used with the above-described variation of the embodiment. In this example, three shapes grouped by the graphic commands 49 and 56 are filled concurrently according to the scan pattern designated by the graphic command 48.

First, the contour drawing means 8 and draft filling means 9 in the drawing controller 13 draw in the draft memory 7 a circle whose center $(X_{c2}, X_{c2})$ and radius R are specified by the graphic command 51, based on the value 1 corresponding to the color 2 designated by the graphic command 50. Written likewise in the draft memory 7 are two rectangles. One rectangle with its vertexes $(X_1, Y_1)$–$(X_4-Y_4)$ specified by the graphic command 53 is drawn based on the value 2 corresponding to the color 5 specified by the graphic command 52; the other rectangle, containing a point $(X_5, Y_5)$ and having a height X and a width Y specified by the graphic command 55, is drawn based on the value 3 corresponding to the color 8 specified by the graphic command 54.

In accordance with the scan pattern specified by the graphic command 48, the scan coordinate determining means 11 in the drawing controller 13 judges each of those dots in the draft memory 7 which constitute the drawn shape. A dot with the value 0 is considered to exist outside the shape; a dot with any of the values 1–3 is considered to fall within the shape (including the contour). Based on this judgement, the dot drawing means 12 draws in the display frame memory 2 a four-bit code for display in the color 2 with respect to each value-1 dot, another four-bit code for display in the color 5 with respect to each value-3 dot, and another four-bit code for display in the color 8 with respect to each value-3 dot. In this manner, the different shapes are filled concurrently with different colors.

To have more than 16 colors for display, the bit count $D_1$ of the display frame memory 2 need only be increased. Where more than three colors are desired for concurrent filling, the bit count $D_2$ of the draft memory 7 need only be raised.

In the above variation of the first embodiment, shapes are first drawn in the draft memory 7 by the contour drawing means 8, followed by the filling of these shapes by the draft filling means 9. Alternatively, the draft filling means 9 may draw shapes based directly on the contour data contained in the graphic data. This alternative provides the same effects as the variation described above.

Figure 12:
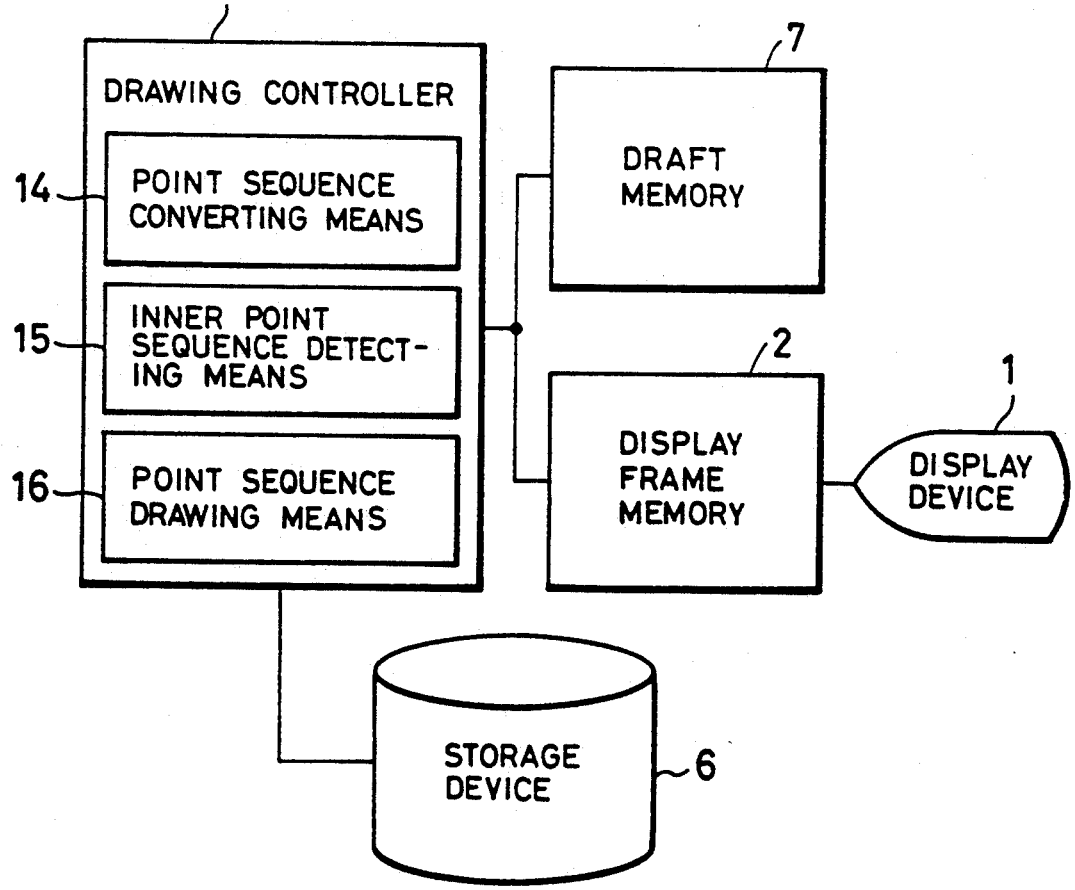
FIG. 12 is a block diagram of a second embodiment of the invention.

FIG. 12 is a block diagram of the second embodiment of the invention which will now be described. In FIG. 12 as well as in FIG. 1, like reference characters designate like or corresponding parts, and any repetitive description thereof is omitted. In FIG. 12, a point sequence converting means 14 converts the contour of a shape to be displayed on the display device 1 into closed contour point sequence data. An inner point sequence detecting means 15 admits as outer point sequence data the contour point sequence data converted by the point sequence converting means 14, the means 15 detecting the inner point sequence data in contact with the interior of the outer point sequence data, the means 15 further admitting consecutively as outer point sequence data the inner point sequence data detected by the means 15 itself, the means 15 further detecting consecutively the inner point sequence data in contact with the interior of the outer point sequence data admitted. A point sequence drawing means 16 draws in the display frame memory 2 the inner point sequence data detected by the inner point sequence detecting means 15.

The drawing controller 13 comprises the point sequence converting means 14, inner point sequence detecting means 15 and point sequence drawing means 16 illustratively in the form of software.

Figure 14:
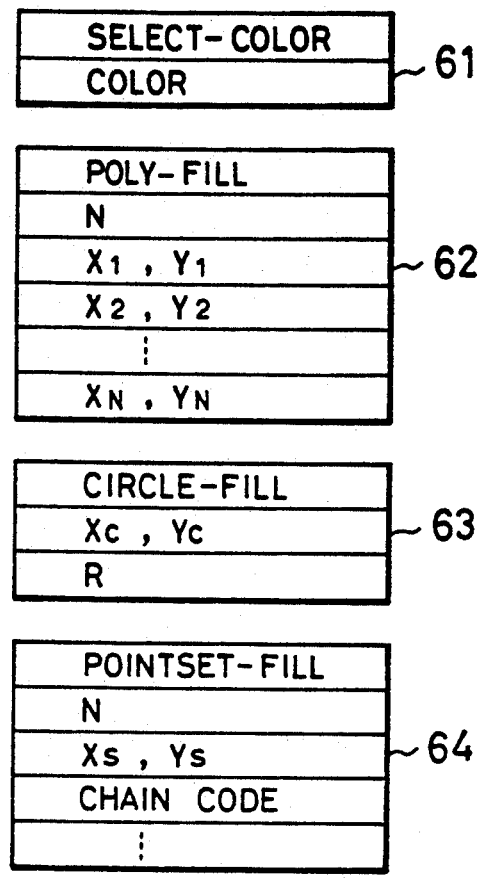
FIG. 14 is a view depicting a series of graphic commands constituting graphic data.

How the second embodiment works will now be described with reference to FIG. 13, which is a flowchart showing the filling steps involved. In step ST11, the drawing controller 13 reads graphic data from the storage device 6. The graphic data is a collection of graphic commands illustratively shown in FIG. 14. Each of these graphic commands is constituted by an operation code indicating the type of the command and by operands specifying the data needed to execute the command. As illustrated, the graphic command 61 designates a drawing color. The graphic commands 62-64 specify the filling of, respectively, a polygon, a circle and a shape whose contour is defined by chain codes.

Figure 15:
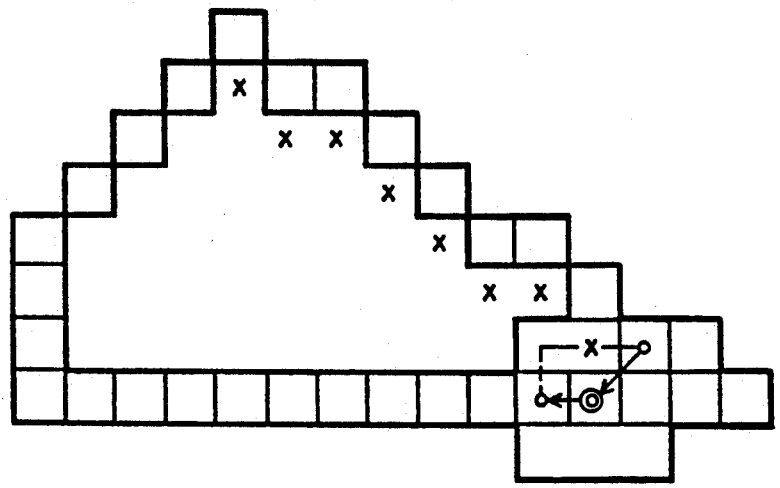
FIGS. 15(a-h) are views illustrating the process of detecting inner point sequence data.
Figure 15:
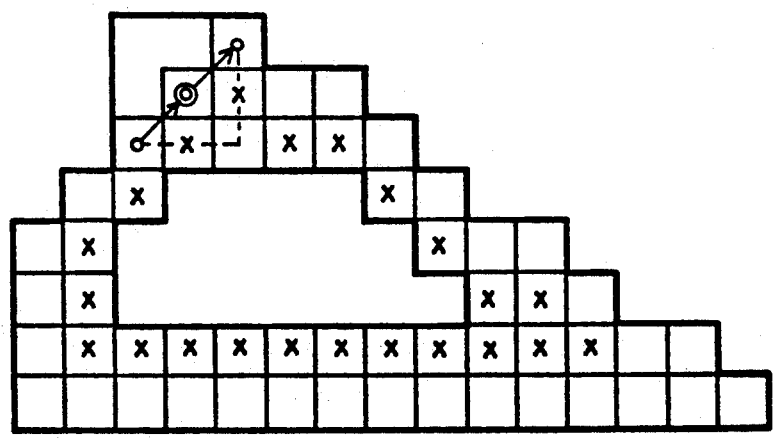

When the graphic command 62 of the graphic data is read out, the contour of the polygon whose vertexes $(X_1, Y_1)-(X_N, Y_N)$ are specified by the operands in the command 62 is converted in step ST12 into closed contour point sequence data by the point sequence converting means 14. If the graphic data is already closed by chain codes in the form of closed contour point sequence data, as with the graphic command 64, this converting process is not necessary. FIG. 15 (A) shows a typical closed contour point sequence. The contour point sequence data may be a sequence of coordinates or a set of data compressed by chain codes, as shown in FIG. 16. The chain codes are, in the case of four adjacently connected points, codes "01", "11", "10" and "00" assigned to an upper, a lower, a left-hand and a right-hand point, respectively, as depicted in FIG. 16 (A). In the case of eight adjacently connected points, the chains codes are codes "000", "001", "010", . . . , "111" assigned counterclockwise to a total of eight points containing the four "cardinal" points and four more points each between two such cardinal points, the code "000" corresponding to the right-hand point, as shown in FIG. 16 (B). The contour data illustratively represented by the polygon filling command 62 and circle filling command 63 is converted into the above-described contour point sequence data by known methods in the art, such as generation of straight lines and curves in computer graphics. Description of these known methods is omitted from this specification.

In step ST13, the contour point sequence data thus converted is input as the first outer point sequence data into the inner point sequence detecting means 15. Upon receipt of the outer point sequence data, the inner point sequence detecting means 15 enters step ST14 and starts detecting inner point sequence data which is in contact with the interior of the outer point sequence data. FIG. 13 is a flowchart showing how these steps are executed.

Figure 17:
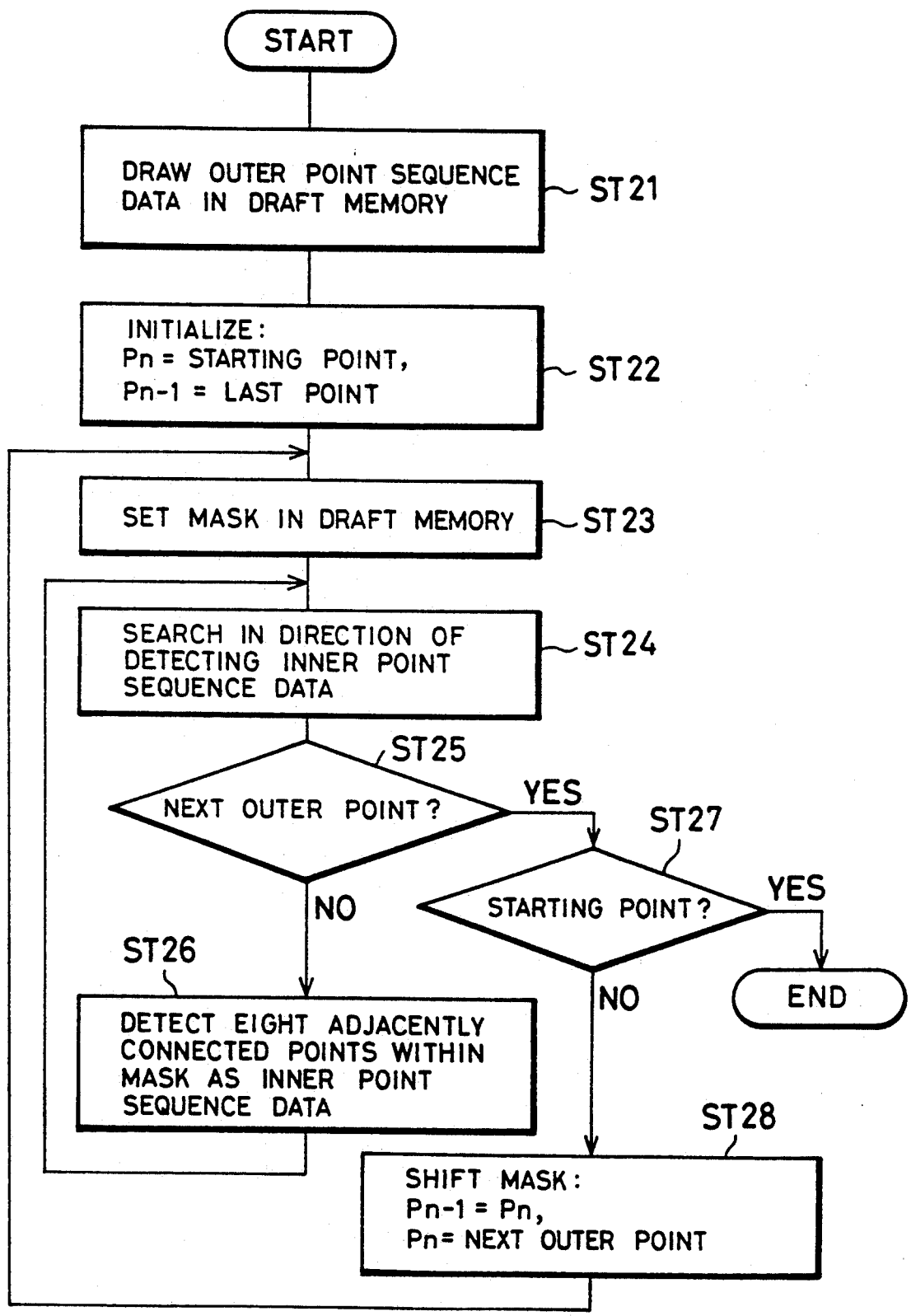
FIG. 17 is a flowchart depicting the steps to detect inner point sequence data.

In step ST21 of FIG. 17, the inner point sequence detecting means 15 draws the input outer point sequence data in the draft memory 7 spatially corresponding to the display frame memory 2. In step ST22, the inner point sequence detecting means 15 performs initialization, setting the starting point coordinates to Pn and the last point (end point) coordinates to Pn−1. In step ST23, a 3×3 mask is set to the point Pn of the outer point sequence data in the draft memory 7. In step ST24, the points adjacent to the point Pn within the mask are searched one by one starting from the point Pn−1 in the detecting direction, until the next outer point is detected in step ST25. In a step ST26, eight adjacently connected points are detected as inner point sequence data. The detecting direction is clockwise starting from the point Pn−1 because, with the outer point sequence data written clockwise, the interior of the shape to be displayed is on the right-hand side of the advance direction of the point sequence. FIG. 15 (B) indicates these detected inner points marked with a cross (x) each.

When the next outer point is detected in step ST25, step ST26 is reached. In step ST26, a check is made to see if the detected outer point is the starting point. If the detected outer point is not the starting point, step ST28 is reached. In step ST28, the mask is shifted. That is, the coordinates set to the point Pn are shifted and set to the point Pn−1, and the coordinates of the next outer point detected in step ST25 are set to the point Pn. Thereafter, the processing is returned to step ST23 in which the mask is set to the outer point sequence data detected earlier, and the process is repeated. The steps involved are executed as shown in FIGS. 15 (C)-15 (H). If the mask is set to the point marked with a double circle (◎) depicted in FIG. 15 (F), the point located lower left of the marked point is detected as the next outer point sequence data. Although the mask is not set to the four points marked with a solid circle (●) each, these points have nothing to do with the detection of inner point sequence data and may be ignored.

When the processing is carried out up to the end point as shown in FIG. 15 (H), the starting point is detected in step ST27. This completes the process, started in step ST14 of FIG. 13, of detecting inner point sequence data. In step ST15, the inner point sequence data detected in this manner is drawn in the display frame memory 2 by the point sequence drawing means 16 using the color specified by the graphic command 61. In step ST16, a check is made to see if all inner point sequence data has been detected. If the data detection is not completed, the above-mentioned inner point sequence data detected by the inner point sequence detecting means is input anew as outer point sequence data in step ST17. The processing is then returned to step ST14, and inner point sequence data in contact with the applicable outer point sequence data starts to be detected.

Figure 18:
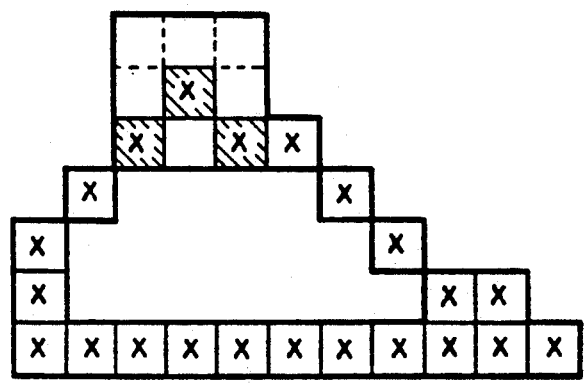
FIGS. 18(a-b) are views illustrating the data format in which the inner point detecting means admits outer point sequence data.
Figure 18:
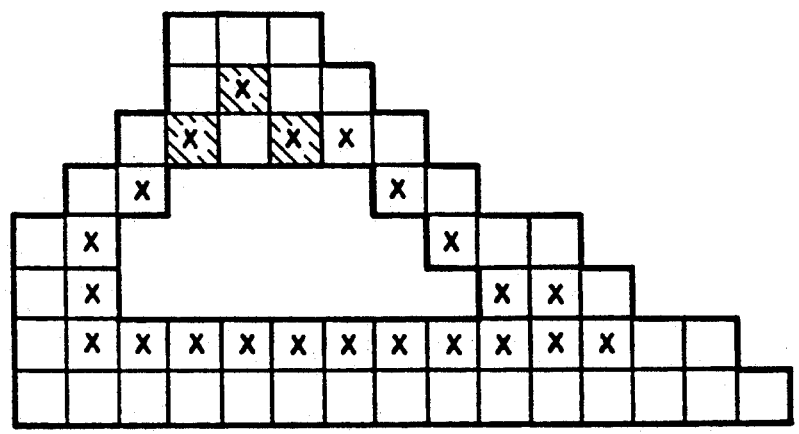

In the above setup, outer point sequence data is given to the inner point sequence detecting means 15 in the form of a coordinate sequence and chain codes. As illustrated in FIG. 18 (A), the outer point sequence is drawn in the draft memory 7 after the latter has been cleared.

Another way to give the outer point sequence data to the inner point sequence detecting means 15 is to draw consecutively inner points in the draft memory 7 even as the inner point sequence is being detected, the means 15 being supplied, as the outer point sequence data of the next step, with the inner point sequence written in the draft memory 7 and the coordinates of one inner point which serves as the starting point. If this alternative way is adopted, there is no need to clear the draft memory 7 and to draw therein the outer point sequence given in the form of a coordinate sequence and chain codes.

The above alternative way is made possible because, as described, any previously detected inner point sequence drawn in the draft memory 7 does not affect the current detection of the inner point sequence through the use of the mask (see FIG. 18 (B)).

In the preceding description, the data given to the point sequence drawing means 16 is also the inner point sequence data in the form of a coordinate sequence and chain codes. Alternatively, inner points detected during the process of inner point sequence detection may be drawn consecutively in the display frame memory 2.

Figure 19:
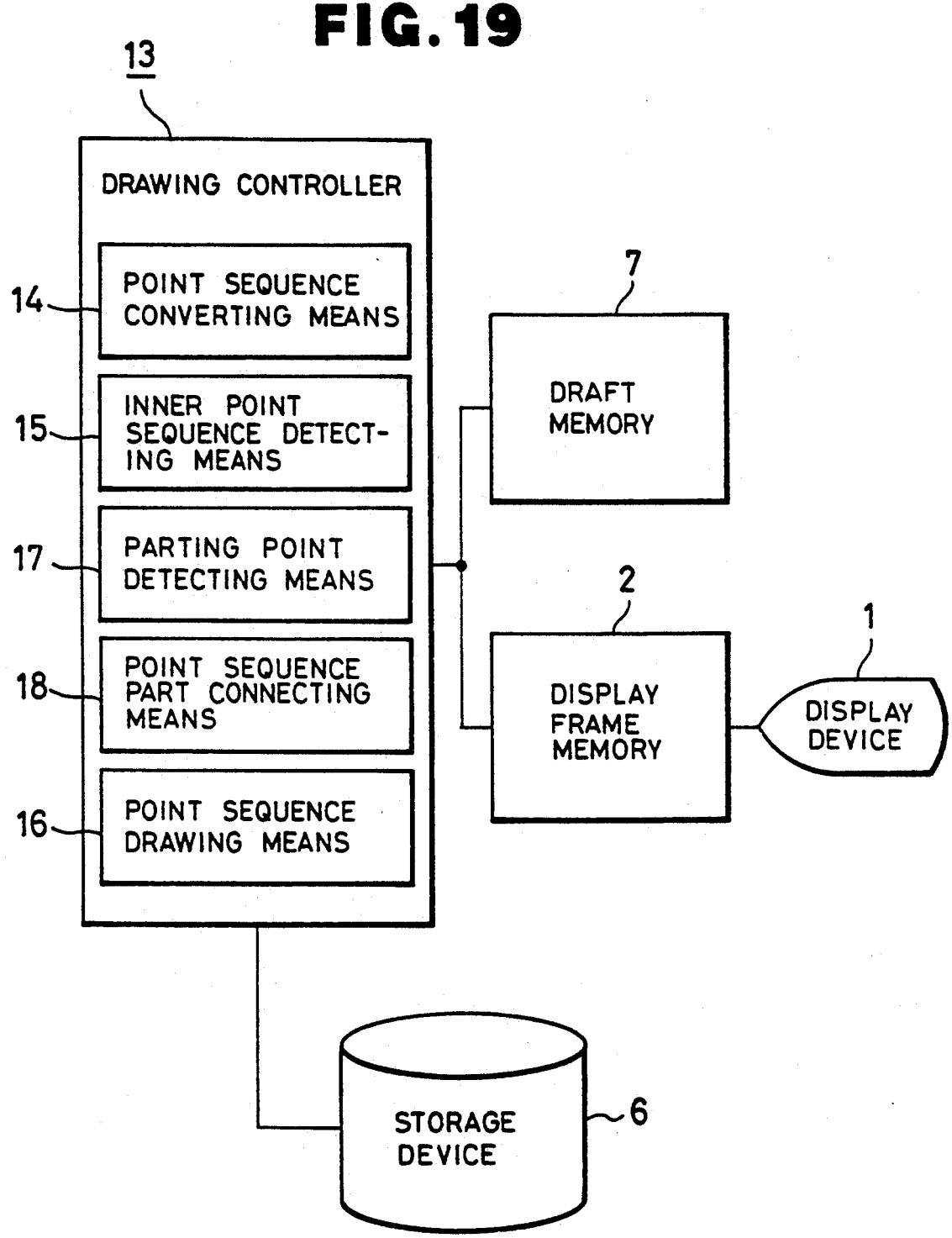
FIG. 19 is a block diagram of a third embodiment of the invention.

FIG. 19 is a block diagram of the third embodiment of the invention which will now be described. In FIGS. 19 and 12, like reference characters designate like or corresponding parts, and any repetitive description thereof is omitted. In FIG. 19, a parting point detecting means 17 detects a point that parts the inner point sequence data which is detected by the inner point sequence detecting means 15. A point sequence part connecting means 18 connects into a plurality of closed inner point sequence data, opened inner point sequence data parted by the parting points that may be detected by the parting point detecting means 17. These means 17 and 18 are practiced in the drawing controller 13 illustratively in the form of software like the point sequence converting means 14, inner point sequence detecting means 15 and point sequence drawing means 16.

Figure 20:
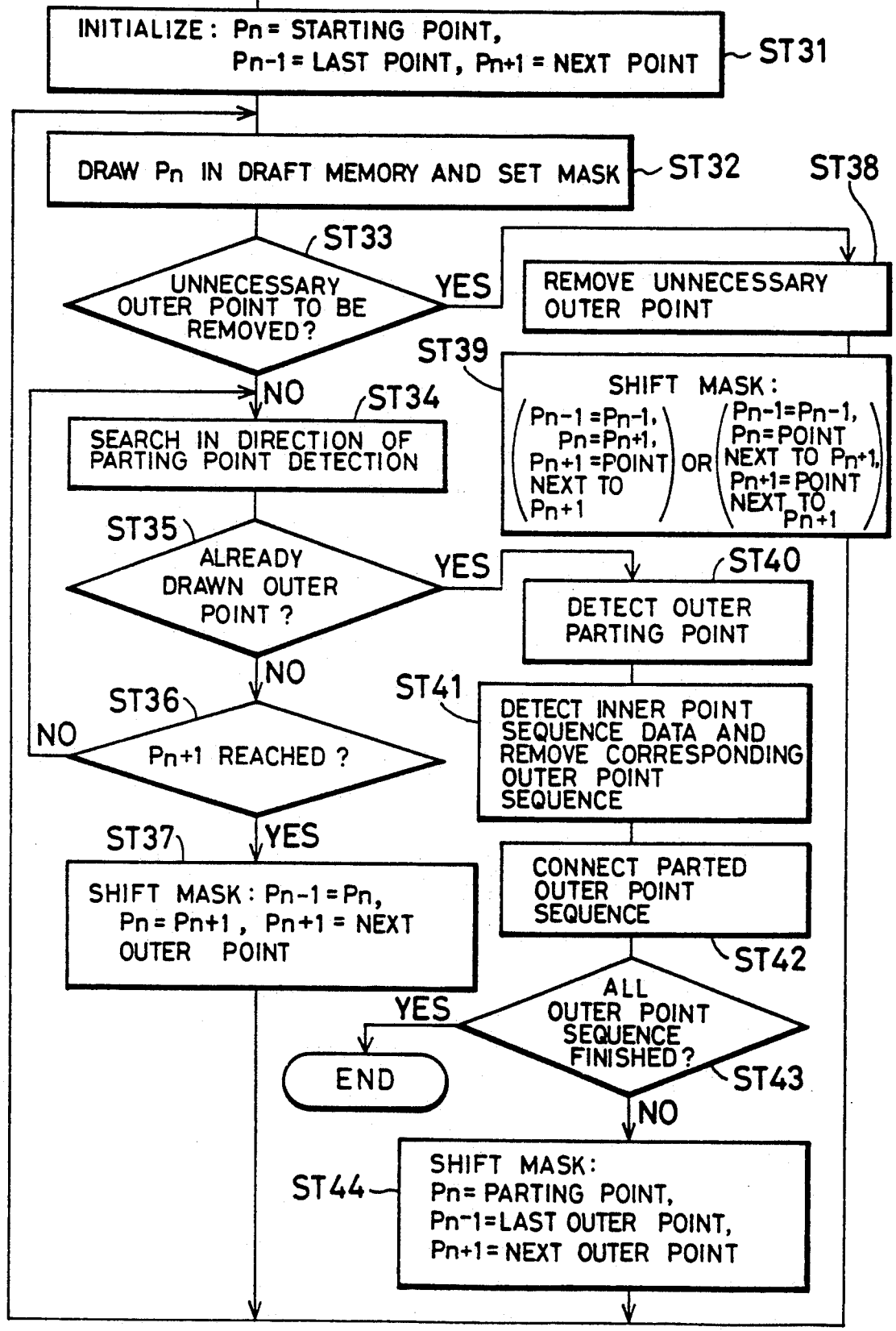
FIG. 20 is a flowchart showing the steps taken by a parting point detecting means and a point sequence part connecting means contained in a drawing controller of the third embodiment.
Figure 21:
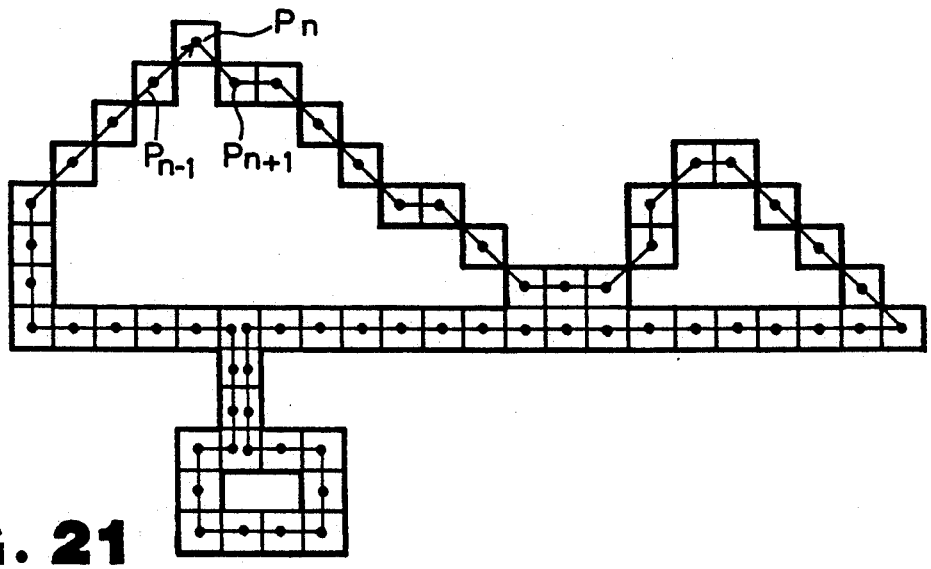
FIGS. 21(a-r) are views showing how outer point sequence data is drawn by the third embodiment and how inner point sequence data is detected thereby.
Figure 21:
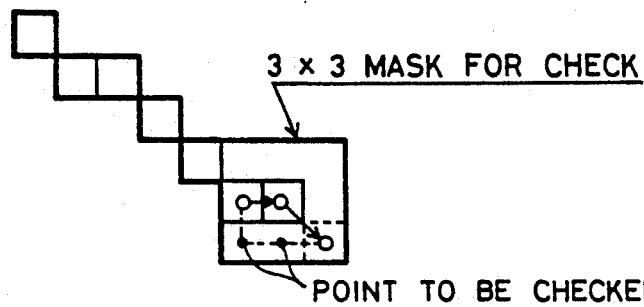
Figure 21:
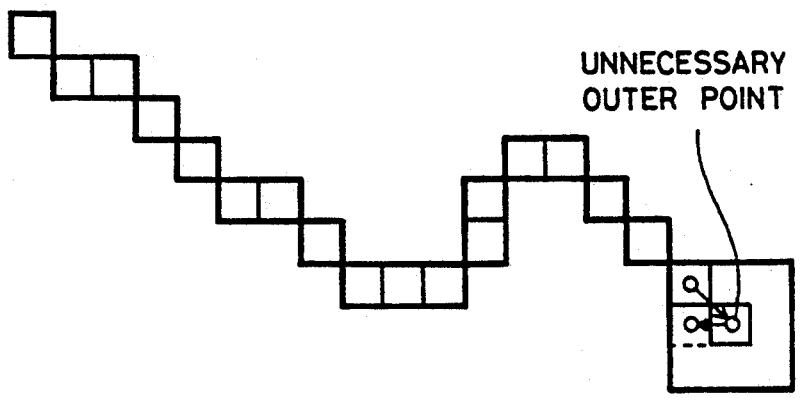
Figure 21D:
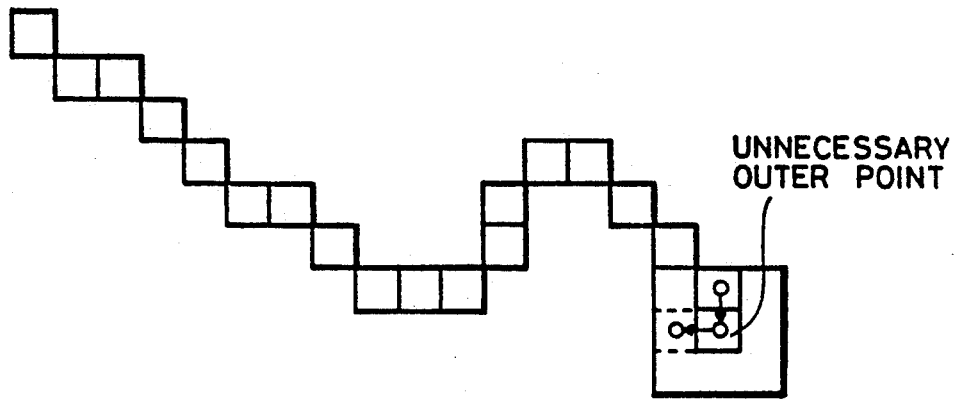
Figure 21E:
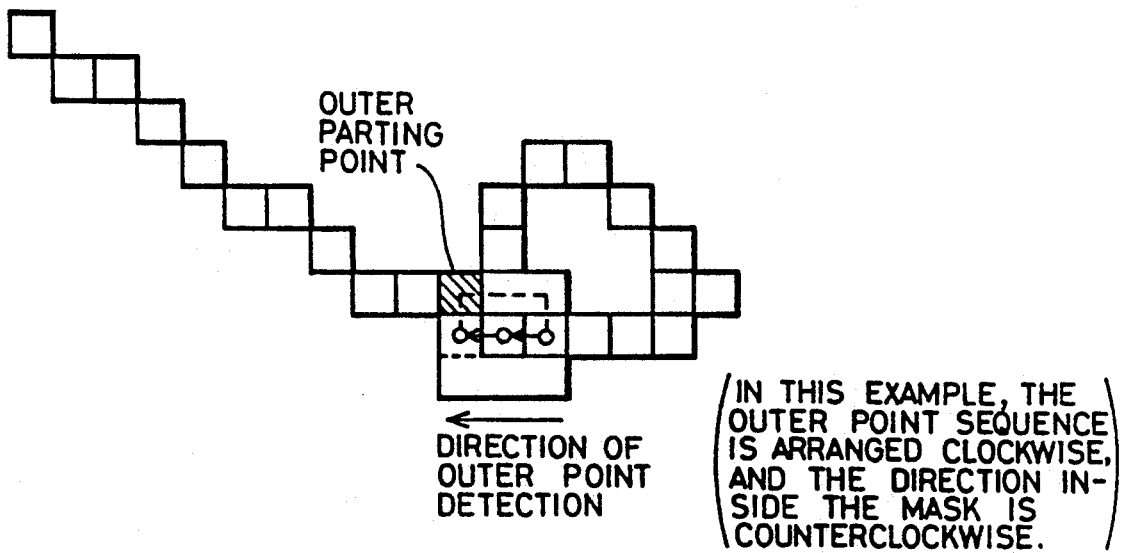
Figure 21:
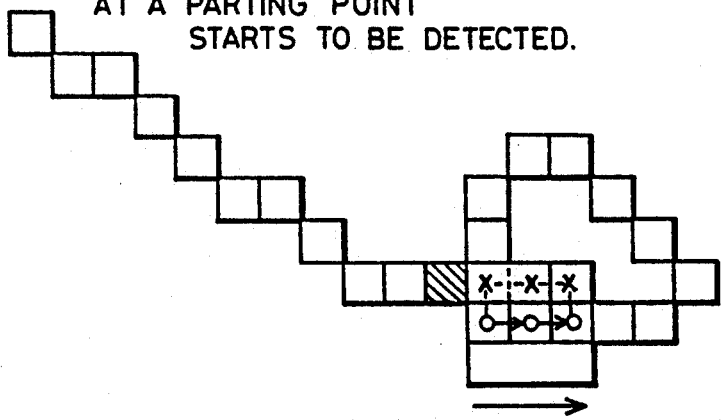
Figure 21:
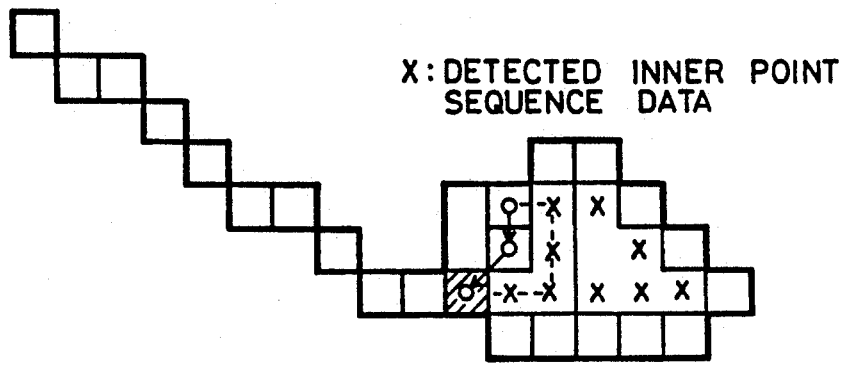
Figure 21:
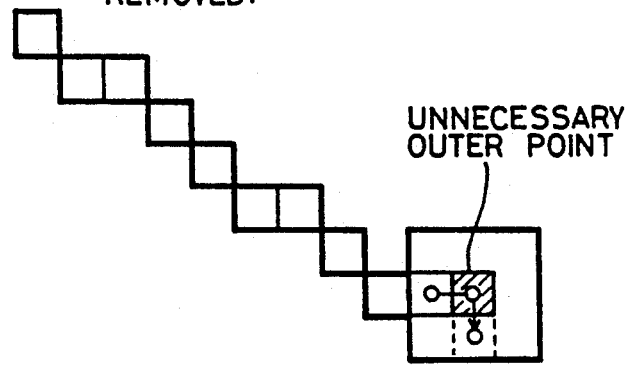
Figure 21:
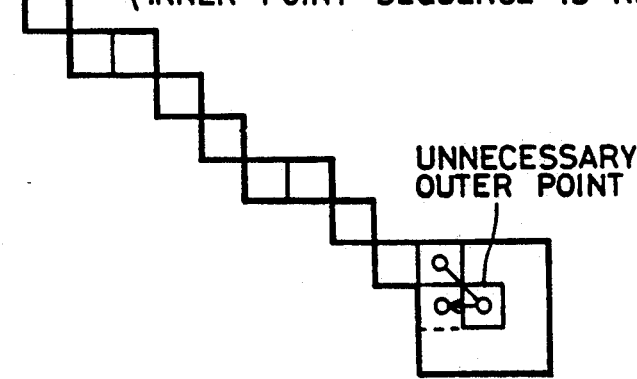
Figure 21:
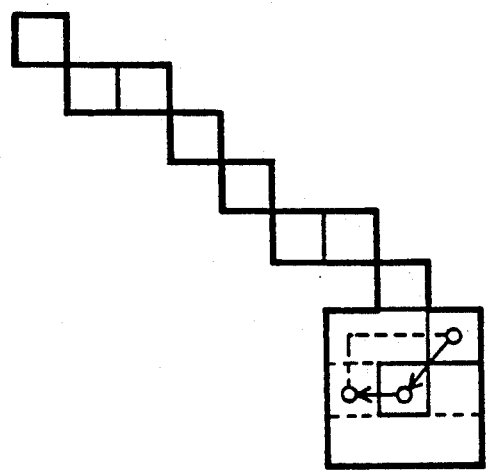
Figure 21:
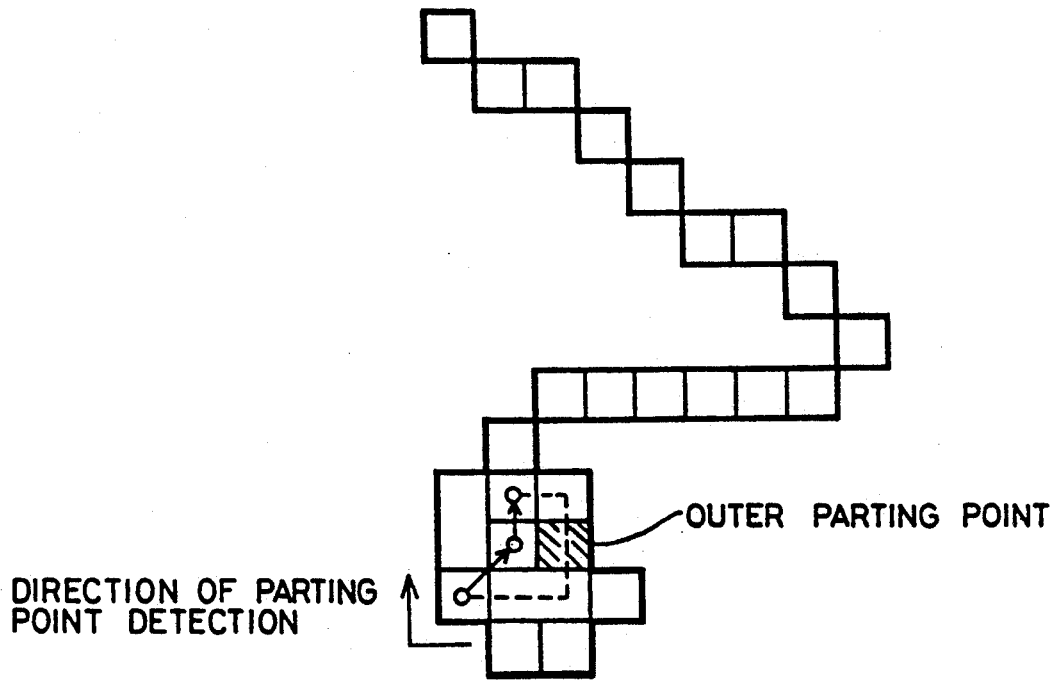
Figure 21:
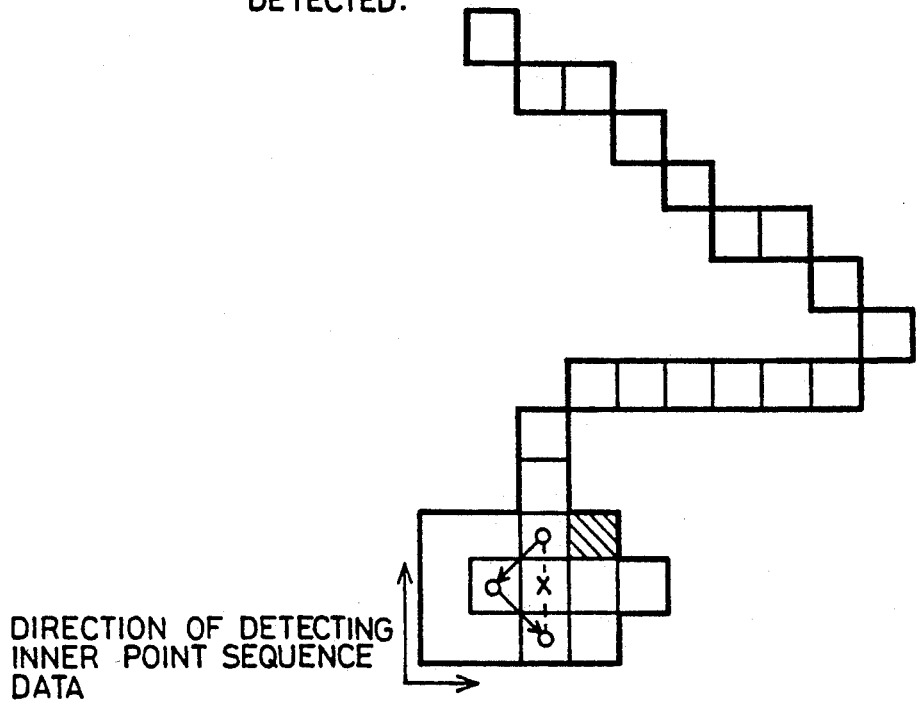
Figure 21:
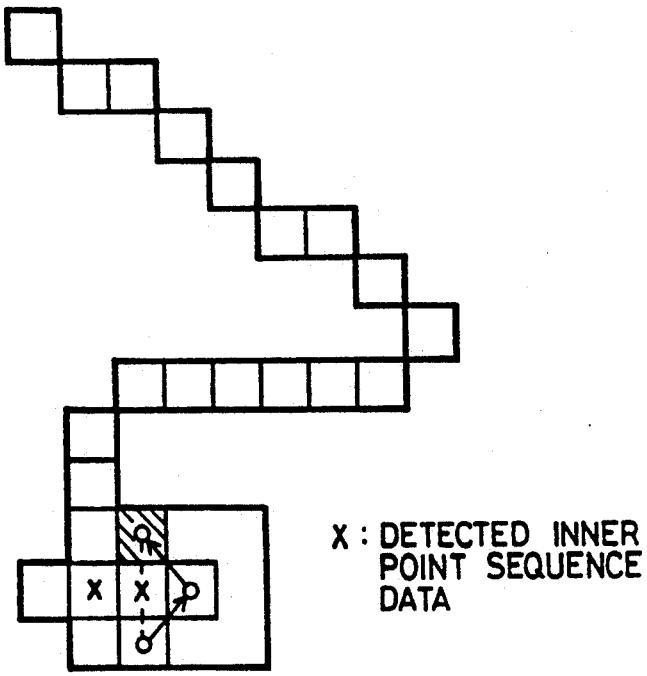
Figure 21:
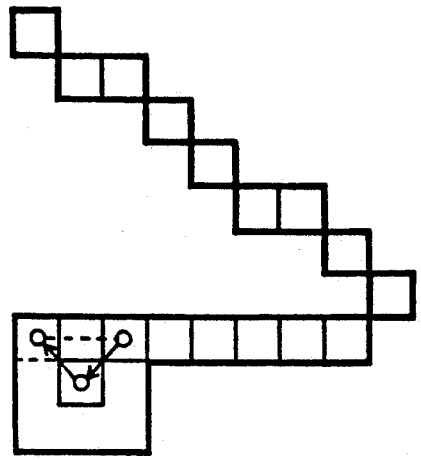
Figure 21:
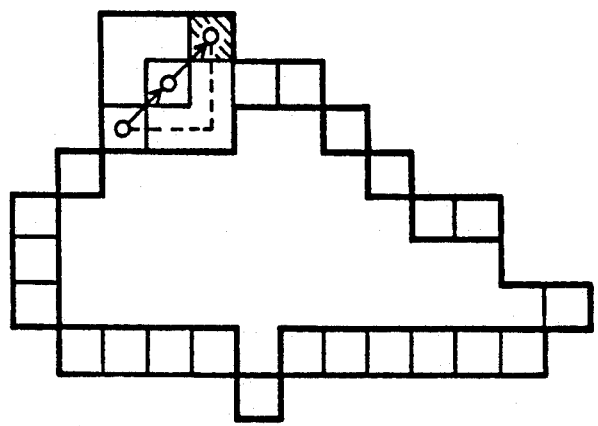
Figure 21:
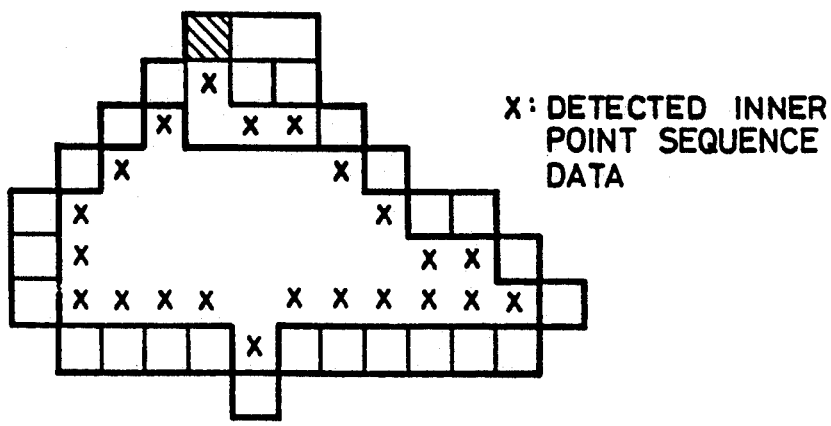

How the third embodiment works will now be described. FIG. 20 is a flowchart showing the steps executed by the parting point detecting means 17 and the point sequence part connecting means 18 contained in the drawing controller 13 of the third embodiment. FIG. 21 is a set of views showing how outer point sequence data is drawn in the draft memory 7 by the third embodiment and how inner point sequence data is detected thereby. FIG. 21 (A) shows an example of outer point sequence data having a parting point and supplied to the inner point sequence detecting means 15.

In step ST31, the parting point detecting means 17 performs initialization, setting the starting port coordinates to Pn, the last point coordinates to Pn−1 and the next point coordinates to Pn+1. In step ST32, the starting point Pn is drawn in the draft memory 7, and a mask is set to that point. In step ST33, a check is made to see if the starting point is located inside or outside of the target shape, the outer point being unnecessary for and removed from detection of inner point sequence data. FIG. 22 illustrates how unnecessary outer points are removed by the mask where outer point sequence data is written clockwise.

If the starting point Pn is found to be a necessary outer point, step ST34 is reached. In step ST34, a counterclockwise search is made through the mask from Pn−1 to Pn+1 in the direction of detecting a parting point. In step ST35, a check is made to see if an already drawn outer point is detected. This process is repeated until the point Pn+1 is detected in step ST36. If, during the process, an already drawn outer point is not detected, the mask is shifted to the next point in step ST37. That is, the processing is returned to step ST32 where the point Pn is drawn in the draft memory 7, and the mask is set to that point. How this is done is depicted in FIG. 21 (B). If an unnecessary outer point is detected in step ST33, step ST38 is reached. In step ST38, the unnecessary outer point is removed, and step ST39 is reached. In step ST39, the mask is shifted to the next point, and step ST32 is reached again. How these steps are executed is illustrated in FIGS. 21 (C) and 21 (D).

If an already drawn outer point is detected in step ST35, step ST40 is reached. In step ST40, that already drawn outer point is detected as an outer point that parts the inner point sequence data (i.e., outer parting point), as shown in FIG. 21 (E). In this manner, a parting point is detected if there is any in the inner point sequence data detected by the inner point sequence detecting means 15.

Then in step ST41, the same process as shown in the flowchart of FIG. 17 is carried out to detect inner point sequence data, and any outer point sequence corresponding to the data is removed, as illustrated in FIGS. 21 (F) and 21 (G). With the corresponding outer point sequence removed, step ST42 is reached. In step ST42, the point sequence part connecting means 18 connects the already drawn outer point sequence to the remaining outer point sequence in the location where the outer parting point is located. That is, the point sequence part connecting means 18 performs three operations: detecting the parted inner point sequence part which is detected as a closed point sequence, removing the corresponding outer point sequence part, and connecting the outer point sequence which is disconnected by removal. The three operations of the point sequence part connecting means 18 combine to connect the opened inner point sequence data which is parted by each parting point into a plurality of closed inner point sequence data.

In step ST43, a check is made to see if all outer point sequence data has been detected. If the detecting process is not completed, step ST44 is reached. In step ST44, the mask is shifted, and step ST32 is reached again. In step ST32, the drawing of outer point sequence data is resumed. FIG. 21 (H) illustrates how these steps are executed.

Thereafter, as depicted in FIGS. 21 (I)−21 (R), the processing proceeds as follows: removing the unnecessary outer point (I), drawing the outer point sequence (J), detecting the outer parting point (K), detecting the inner point sequence data ((L), (M)), resuming the drawing of the outer point sequence (N), removing the unnecessary outer point ((N), (O)), drawing the outer point sequence (P), detecting the outer parting point (Q), and detecting the inner point sequence data (R), in that order. Upon removal of the outer point sequence unnecessary for the detection of inner point sequence data, the unnecessary outer points marked with a solid circle (●) each in FIG. 15 (F) are removed by the mask, as depicted in FIGS. 21 (C) and 21 (D). Likewise, any connected outer point causing the data to part as shown in FIGS. 21 (I) and 21 (O) is removed by the mask. Because the unnecessary outer points marked with solid circles (●) in FIG. 15 (F) are removed, it is possible to remove the corresponding outer point sequence even as the inner point sequence data is being detected in accordance with the steps in the flowchart of FIG. 17.

Then if a check in step ST43 verifies that all outer point sequence has been detected, the processing comes to an end. The detected inner point sequence data is passed on to the point sequence drawing means 16 which in turn draws the data in the display frame memory 2.

Figure 23:
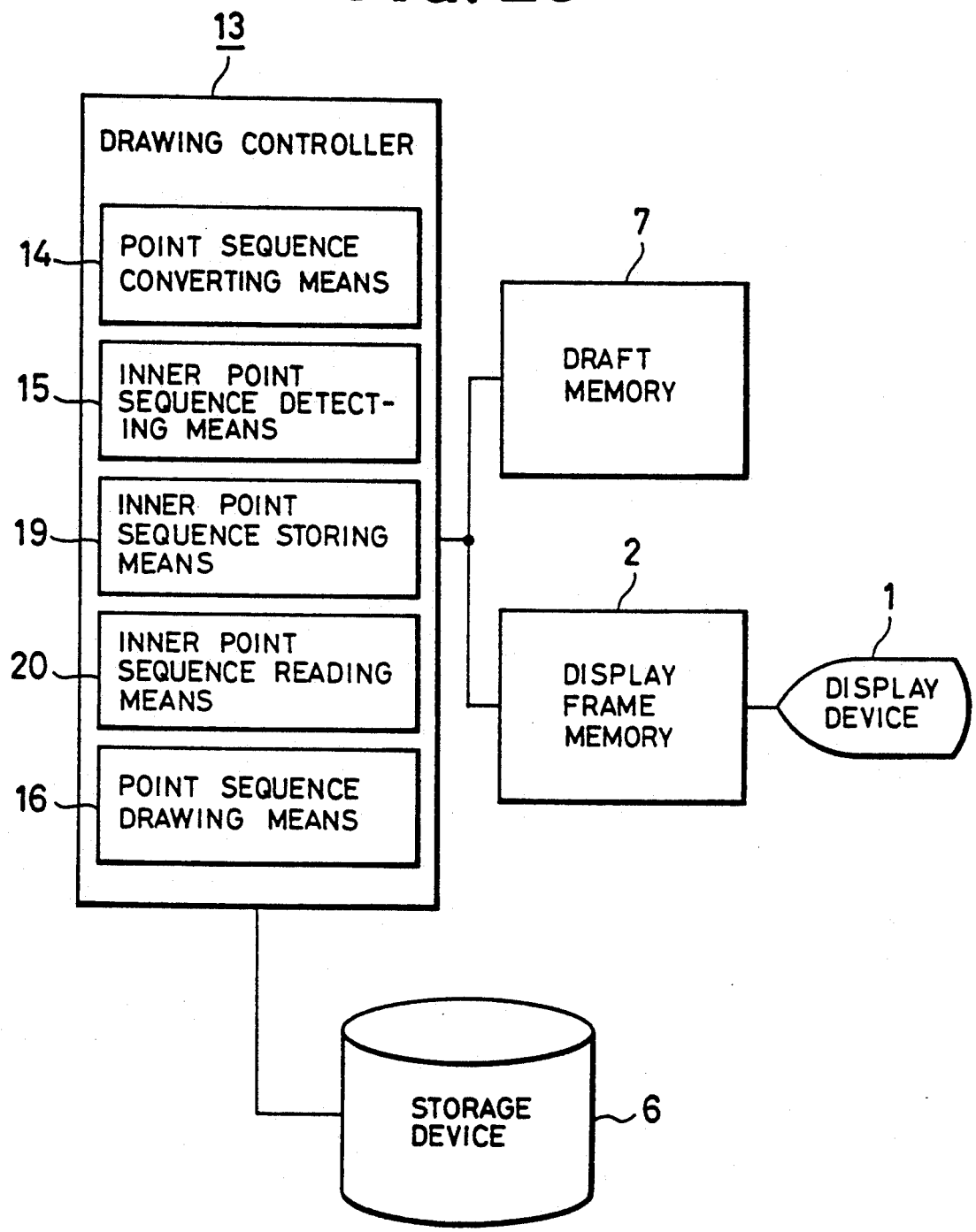
FIG. 23 is a block diagram of a fourth embodiment of the invention.

FIG. 23 is a block diagram of the fourth embodiment of the invention which will now be described. In FIGS. 23 and 12, like reference characters designate like or corresponding parts, and any repetitive description thereof is omitted. In FIG. 23, an inner point sequence storing means 19 stores the inner point sequence data detected by the inner point sequence detecting means 15 in the order in which the data was detected. After all inner point sequence data has been detected by the inner point sequence detecting means 15 and written to the inner point sequence storing means 19, an inner point sequence reading means 20 consecutively reads out the stored data from the inner point sequence storing means 19 from center to contour of the target shape, i.e., by reversing the order in which the data was written, the read data being sent to the point sequence drawing means 16.

The inner point sequence storing means 19 is incorporated in the drawing controller 13. The inner point sequence reading means 20 is practiced in the drawing controller 13 illustratively in the form of software like the point sequence converting means 14, inner point sequence detecting means 15 and point sequence drawing means 16.

Figure 24:
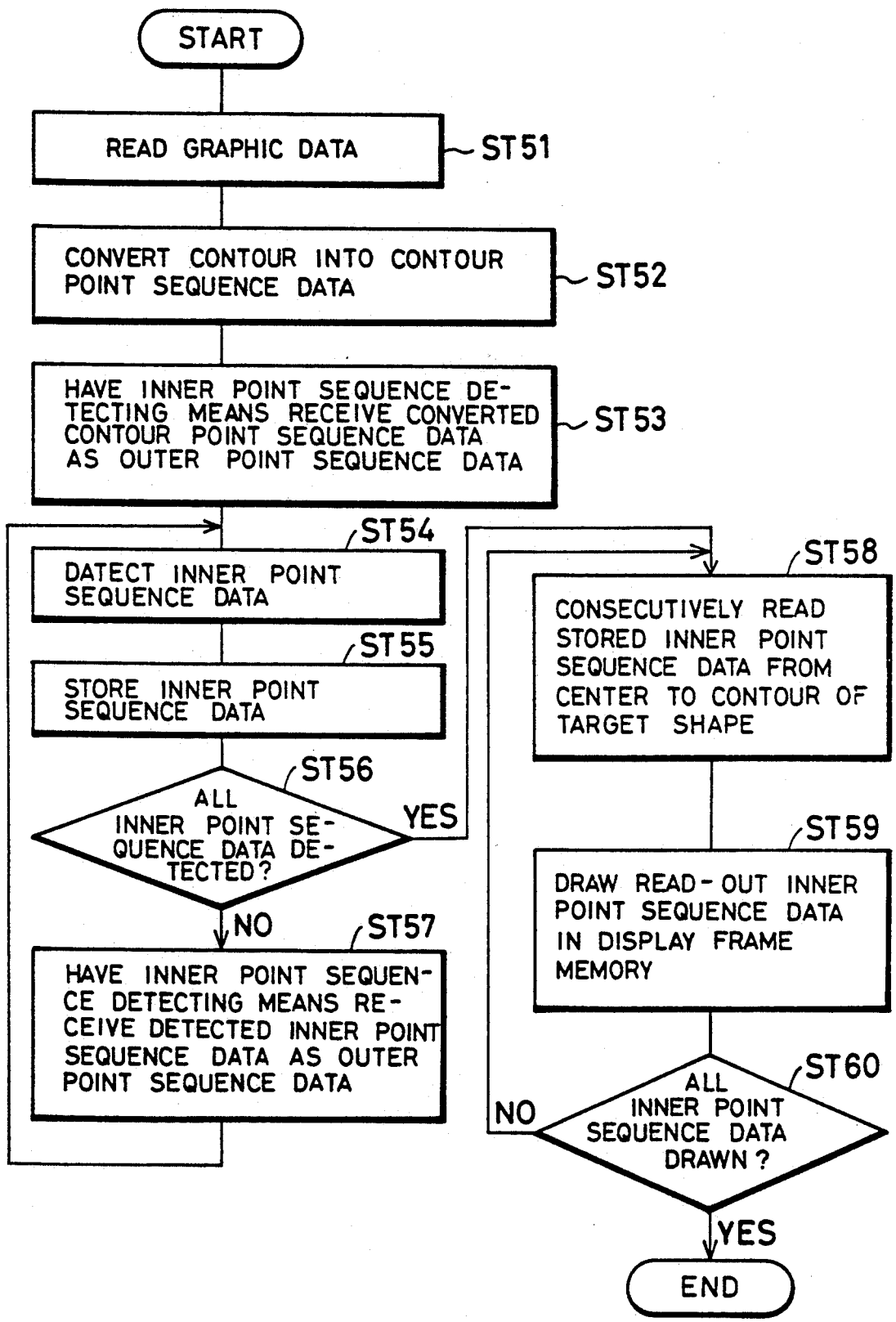
FIG. 24 is a flowchart showing how the fourth embodiment of FIG. 23 works.

How the fourth embodiment works will now be described with reference to FIG. 24, which is a flowchart depicting the filling steps involved. As with the second embodiment shown in FIG. 12, the drawing controller 13 in step ST51 reads graphic data from the storage device 6. If the data is the graphic command 22 shown in FIG. 14, step ST52 is reached. In step ST52, the contour of a polygon whose vertex coordinates ($X_1$, $Y_1$)–($X_N$, $Y_N$) are specified by the operands of the command 22 is converted by the point sequence converting means 14 into the closed contour point sequence data illustrated in FIG. 15 (A).

In step ST53, the contour point sequence data thus converted is input to the inner point sequence detecting means 15 as the first outer point sequence data. In step ST54, the detection of any inner point sequence data in contact with the outer point sequence data is started. As with the second embodiment of FIG. 12, the detecting process is executed in the same manner as described in the flowchart of FIG. 17. A description of the process is thus repetitive and is omitted.

With the detection of the inner point sequence data completed in step ST54, step ST55 is reached. In step ST55, the detected inner point sequence data is written to the inner point sequence storing means 19. In step ST56, a check is made to see if all inner point sequence data has been detected. If the detection of the data is not completed, the inner point sequence data detected in the above manner is input anew as outer point sequence data in step ST57, and step ST54 is reached again. In step 54, any inner point sequence data in contact with the interior of the current outer point sequence data is detected.

If all inner point sequence data is found to be detected in step ST56, step ST58 is reached. In step ST58, the inner point sequence data stored in the inner point sequence storing means 19 is read out consecutively by the inner point sequence reading means 20 from center to contour of the target shape, i.e., in reverse of the order in which the data was written. The inner point sequence data that is read out is sent to the point sequence drawing means 16. In step ST59, the point sequence drawing means 16 draws the data in the display frame memory 2 using the drawing color defined by the graphic command 62 of FIG. 14. The drawing in the display frame memory 2 is repeated until a check in step ST60 verifies that all inner point sequence data has been drawn.

Figure 25:
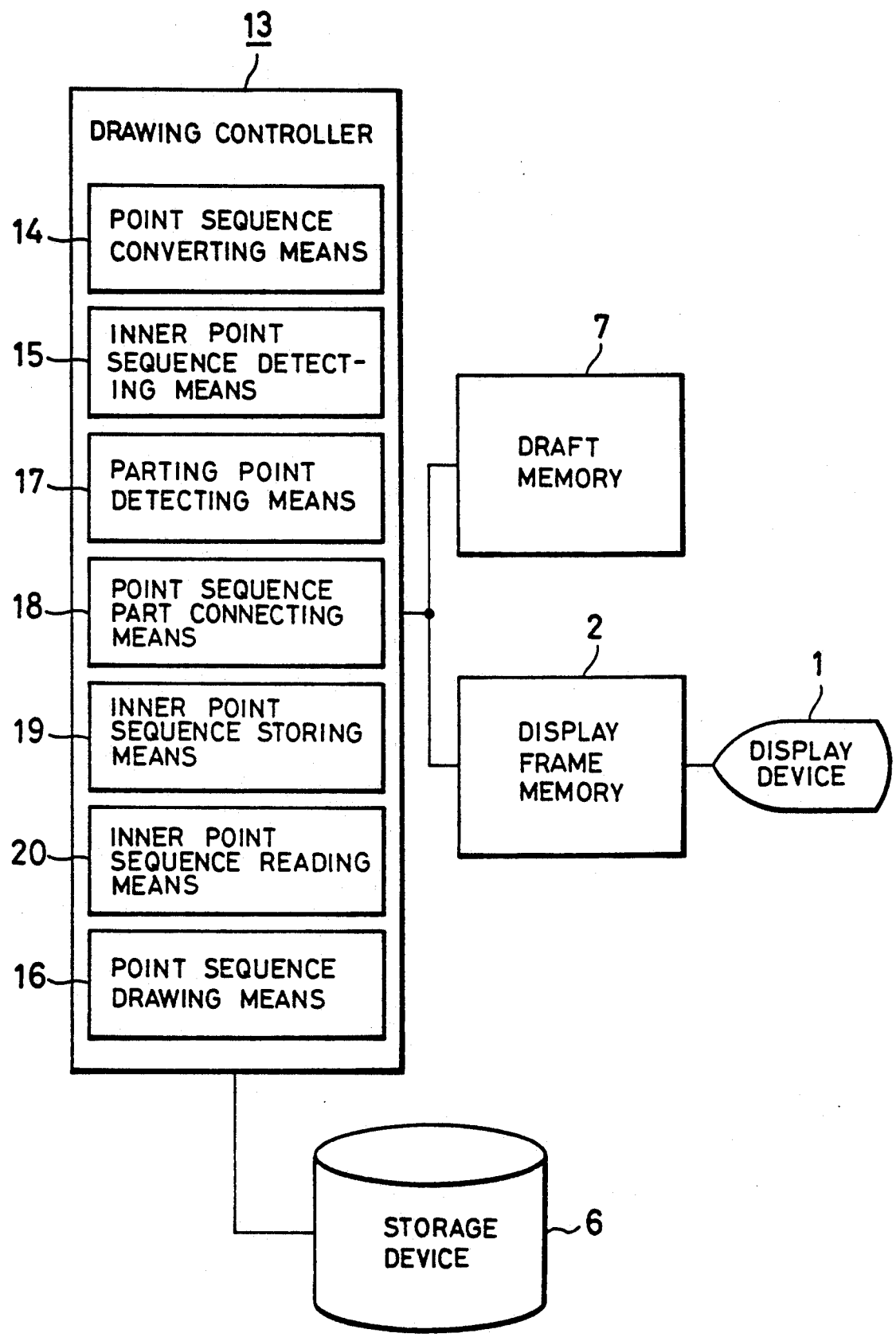
FIG. 25 is a block diagram of a fifth embodiment of the invention.

FIG. 25 is a block diagram of the fifth embodiment of the invention which will now be described. The fifth embodiment is implemented by supplementing the fourth embodiment of FIG. 23 with the parting point detecting means 17 and the point sequence part connecting means 18 used in the third embodiment of FIG. 19.

As in the third embodiment of FIG. 19, the parting point detecting means 17 and the point sequence part connecting means 18 carry out necessary processes according to the steps in the flowchart of FIG. 20. If a check in step ST43 verifies that all outer point sequence has been detected, the processing is terminated. The detected inner point sequence data is sent to the inner point sequence storing means 19 for storage. Subsequent steps are the same as those with the fourth embodiment of FIG. 23. The display screen displays the filling from center to contour of a shape those contour is concave and discontinuous.

Figure 26:
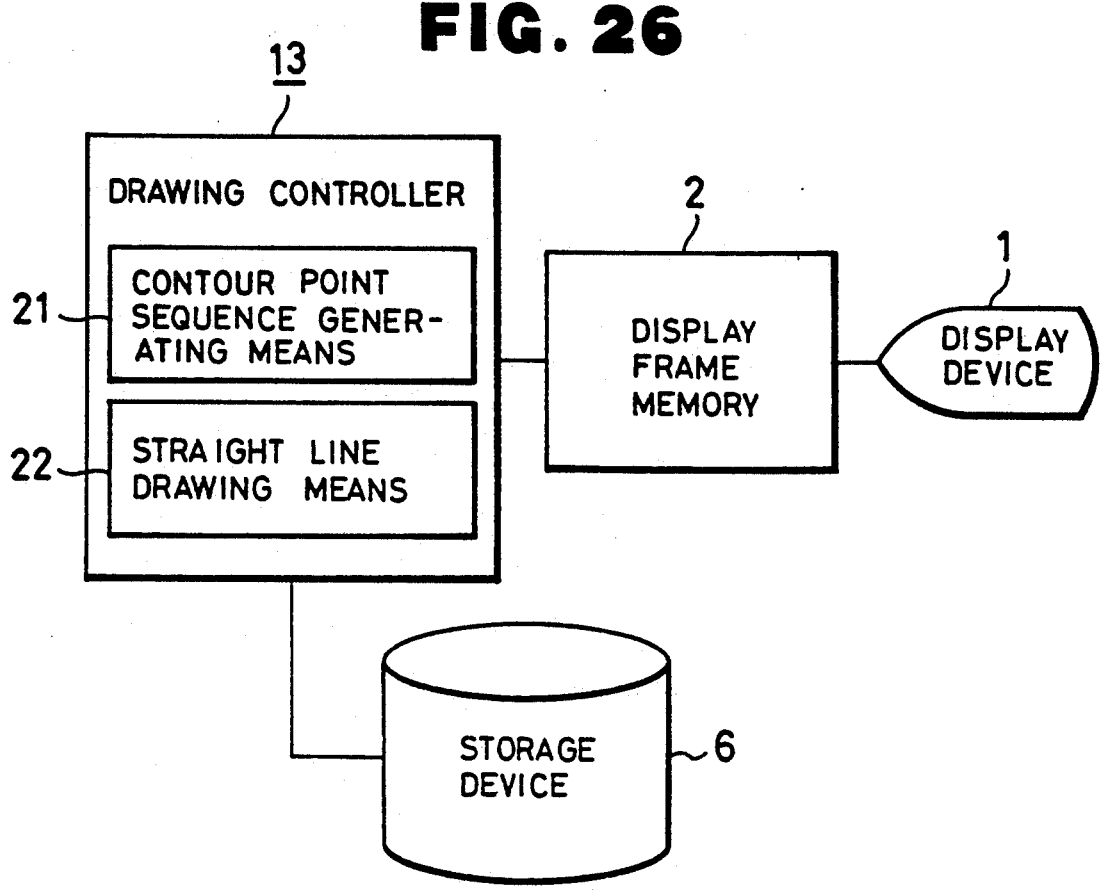
FIG. 26 is a block diagram of a sixth embodiment of the invention.

FIG. 26 is a block diagram of the sixth embodiment of the invention which will now be described. In FIG. 26 as well as in FIG. 1, like reference characters designate like or corresponding parts, and any repetitive description thereof is omitted. In FIG. 26, a contour point sequence generating means 21 consecutively generates the coordinates of each contour point in the contour point sequence of a shape whose contour, displayed on the display device 1, is convex. A straight line drawing means 22 generates a straight line that connects the coordinates of each contour point generated by the contour point generating means 21 to the coordinates of the center of rotation established inside the shape having the convex contour, the straight line being quantized into the nearest pixels based on an appropriate algorithm such as Bresenham's algorithm, the resulting digital straight line being drawn in the display frame memory 2.

The contour point sequence generating means 21 and the straight line drawing means 22 are practiced in the drawing controller 13 illustratively in the form of software.

Figure 28:
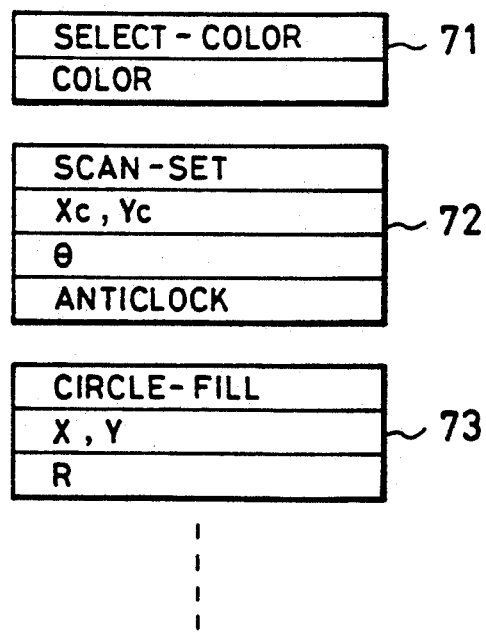
FIG. 28 is a view illustrating a series of graphic commands constituting graphic data.
Figure 27:
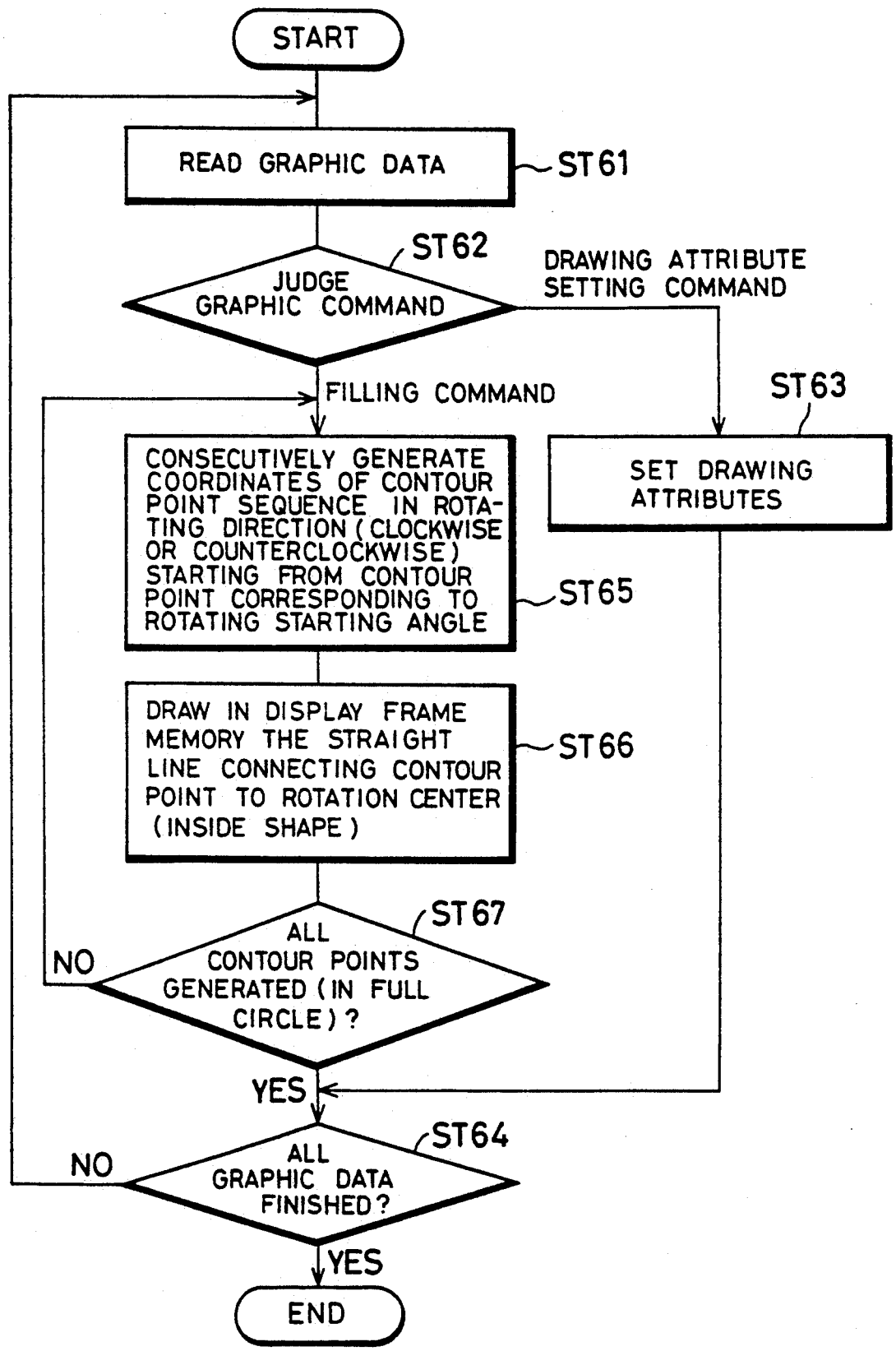
FIG. 27 is a flowchart depicting how the sixth embodiment of FIG. 26 works.
Figure 29:
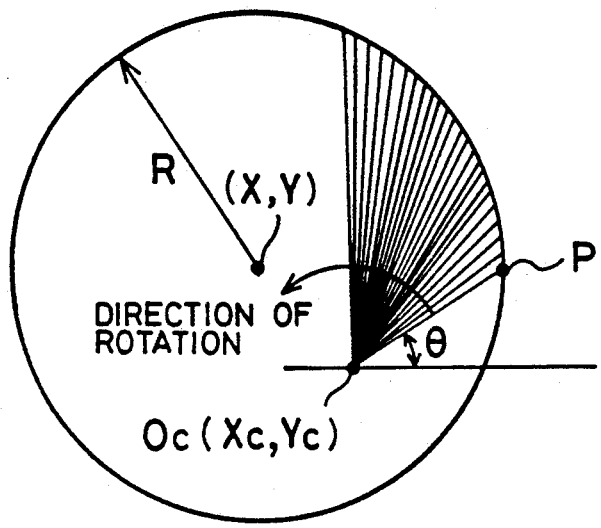
FIG. 29 is a view showing how a shape to be displayed is filled by the sixth embodiment.

How the sixth embodiment works will now be described with reference to FIG. 27, which is a flowchart depicting the filling steps involved. In step ST 61, the drawing controller 13 reads graphic data from the storage device 6. The graphic data is a collection of graphic commands illustratively depicted in FIG. 28. These graphic commands come in two kinds: drawing commands for filling contours, plotting line segments and otherwise drawing shapes; and drawing attribute setting commands for specifying drawing colors, establishing scan patterns and designating other drawing attributes.

Each graphic command of the graphic data that is read in step ST61 is checked for its operation code in step ST62. The graphic command 71 of the graphic data that is read out first has an operation code that designates a drawing color. Thus step ST63 is reached in which the color specified by the operand of the command 71 is established as the drawing color. In step ST64, a check is made to see if all graphic data has been read out. If there still is graphic data to be read, step ST61 is reached again. The graphic command 72 that is read out next has an operation code that designates scan pattern drawing attributes. Thus step ST63 is reached in which the operands of the command 72 specify a scan pattern whose center $O_c$ is defined by coordinates ($X_c$, $Y_c$) and whose scan lines are rotated counterclockwise around that center from a rotating starting angle $\theta$. The processing is then returned from step ST64 to step ST61.

The graphic command 73 that is read out next has an operation code that designates the filling of a circle. So the processing goes from step ST62 to step ST65. This circle is defined as one with its center located at (X, Y) and having a radius R, containing the center $O_c$ around which the scan lines rotate. In step ST65, the contour point sequence generating means 21 consecutively generates coordinates of the contour point sequence of the above circle to be displayed, starting from the contour point P that corresponds to the rotation starting angle $\theta$ established in step ST63. In step ST66, the straight line drawing means 22 generates a straight line that connects the coordinates of the contour point P generated by the contour point generating means 21 to the coordinates of the center of rotation $O_c$ established in step ST63 inside the target shape, the straight line being quantized into the nearest pixels based on an appropriate algorithm such as Bresenham's algorithm, the resulting digital straight line being drawn in the display frame memory 2. In this case, the digital straight line is drawn in the color designated in step ST63.

Figure 30:
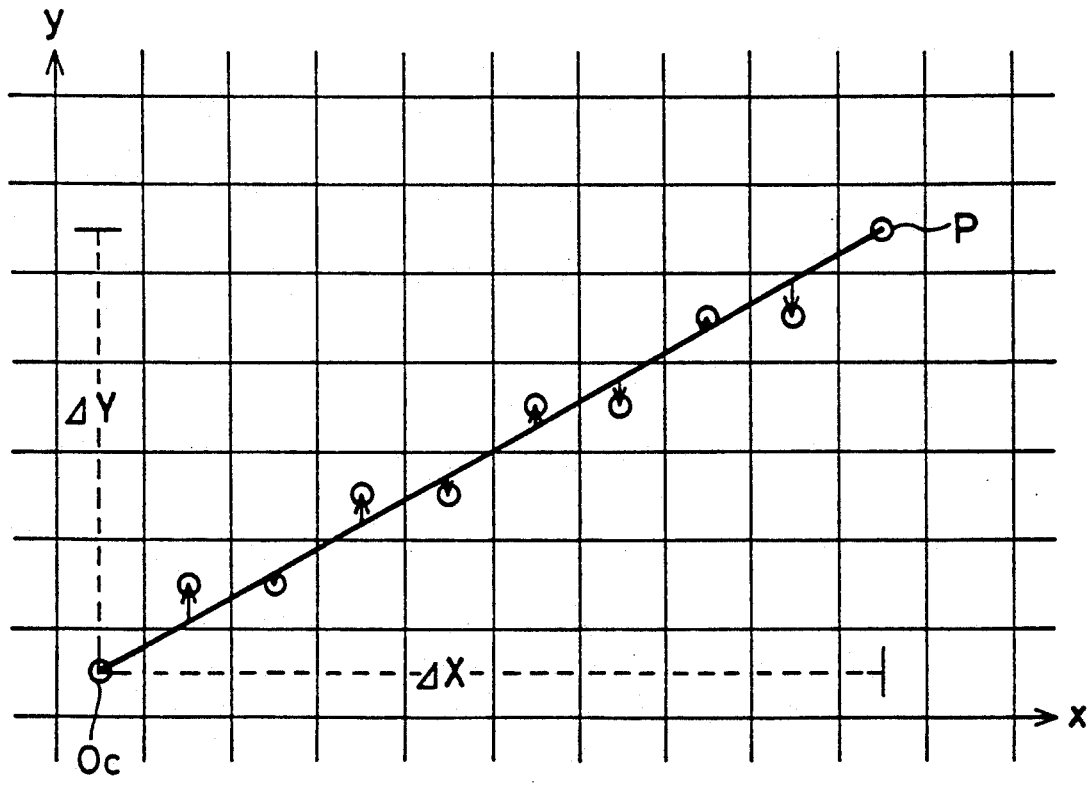
FIG. 30 is a view depicting an algorithm for generating a digital straight line.

FIG. 30 depicts a typical algorithm for generating a digital straight line connecting the contour point P to the center of rotation $O_c$. Where the increment $\Delta X$ in the X axis direction is greater than the increment $\Delta Y$ in the Y axis direction, the coordinates are rounded off by use of the equations $$Xn = Xn-1+1$$

$$Yn = [Yn-1+(\Delta Y/\Delta X)]$$

so that the straight line is quantized into the pixels marked with a hollow circle (○) each. This results in a digital straight line constituted by eight points adjacently connected in any of the four "cardinal" directions (upper, lower, left, right) as well as in any of four more directions each between two such "cardinal" directions. If the increment $\Delta X$ in the X axis direction is greater than the increment $\Delta Y$ in the Y axis direction, the coordinates are rounded off by use of the equations $$Xn = [Xn-1+(\Delta X/\Delta Y)]$$

$$Yn = Yn-1+1$$

so that a similar digital straight line is generated, the line being constituted likewise by eight points adjacently connected in any of the like directions.

In step ST67, a check is made to see if coordinates have been generated for all contour points P along the contour point sequence of the target shape (a circle in this description), i.e., if the contour point sequence of the target shape has been completely followed. If there remains any contour point for which coordinates need to be generated, step ST65 is reached again. In step ST65, the contour point sequence generating means 21 generates coordinates for an adjacent contour point P. The adjacent contour point P is generated in the direction of the scan line rotation established in step ST63. The above process is repeated until a check in step ST67 verifies that all contour points P have been generated.

Figure 31:
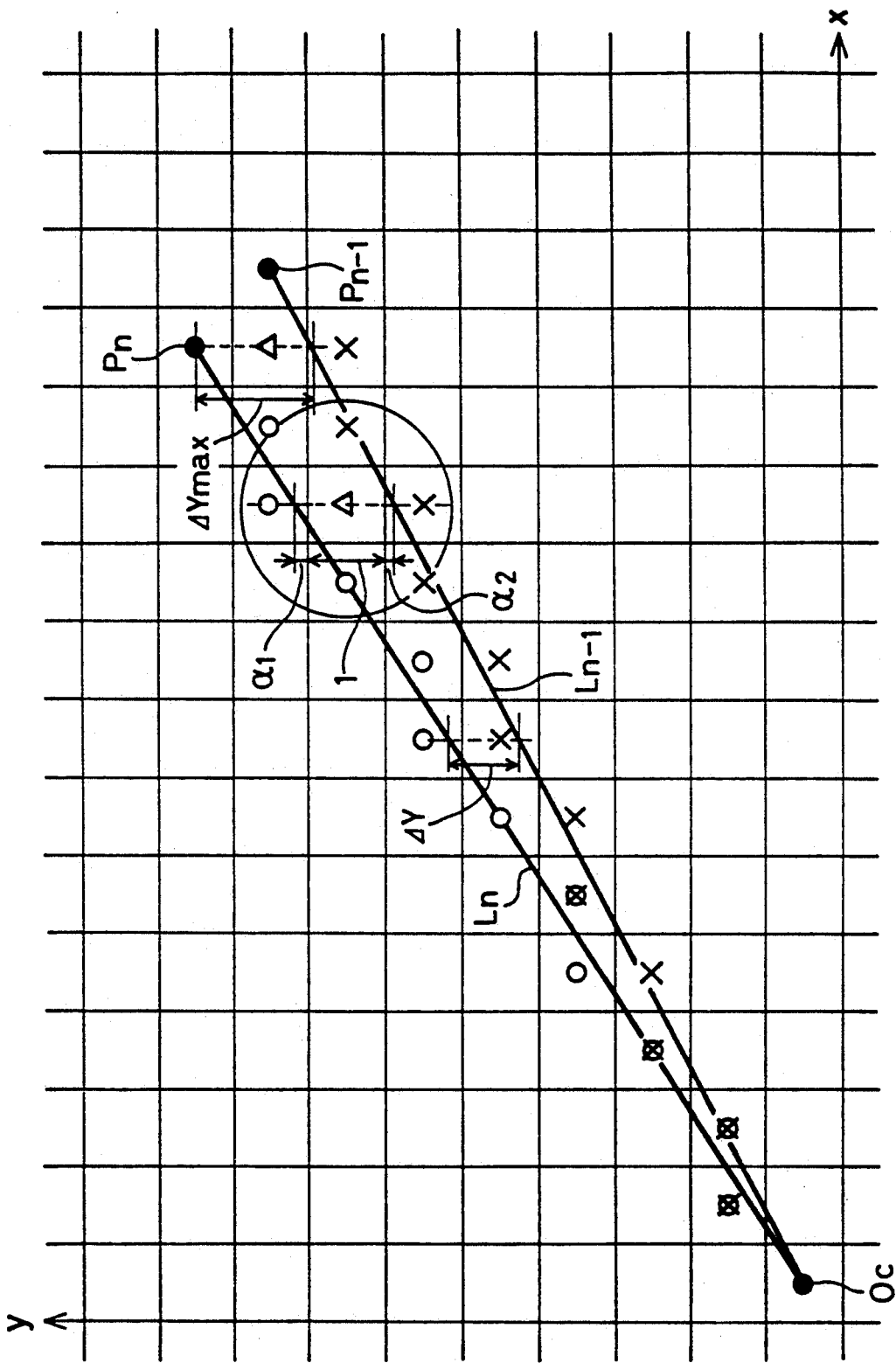
FIG. 31 is a view illustrating how pixels can be left unfilled.

In the sixth embodiment, if each contour point Pn generated by the contour point sequence generating means 21 is adjacently connected to the last contour point Pn−1 in a diagonal direction, making up the eight-adjacent-point connection, there is a possibility of leaving out pixels that are not filled. FIG. 31 describes how that possibility can materialize. In FIG. 31, each pixel marked with a hollow circle (○) is filled with a digital straight line based on the straight line Ln connecting the contour point Pn to the center of rotation $O_c$. Each pixel marked with a cross (×) is filled with a digital straight line based on the straight line Ln−1 connecting the last contour point Pn−1 to the center of rotation $O_c$. Therefore, two pixels marked with a triangle (Δ) each are left unfilled.

As shown in FIG. 31, where the contour point Pn is diagonally connected to the last contour point Pn−1 through eight adjacently connected points, there exists a relationship $$\Delta Y \leq \Delta Y_{max} > 1$$

between a Y axis distance $\Delta Y$ and its maximum value $\Delta Y_{max}$, the Y axis distance occurring between two lines Ln and Ln−1, the line Ln being formed between the contour point Pn and the center of rotation $O_c$, the line Ln−1 being formed between the last contour point Pn−1 and the center of rotation $O_c$. Therefore, if $$\Delta Y = \alpha_1 + 1 + \alpha_2 (\alpha_1, \alpha_2 > 0)$$

as illustrated inside a large circle of FIG. 31, the value $\alpha_1$ causes the line Ln to be quantized into the upper pixel marked with a hollow circle (○); the value $\alpha_2$ causes the line Ln−1 to be quantized into the lower pixel marked with a cross (×). This leaves the pixel marked with a triangle (Δ), unfilled.

Figure 32:
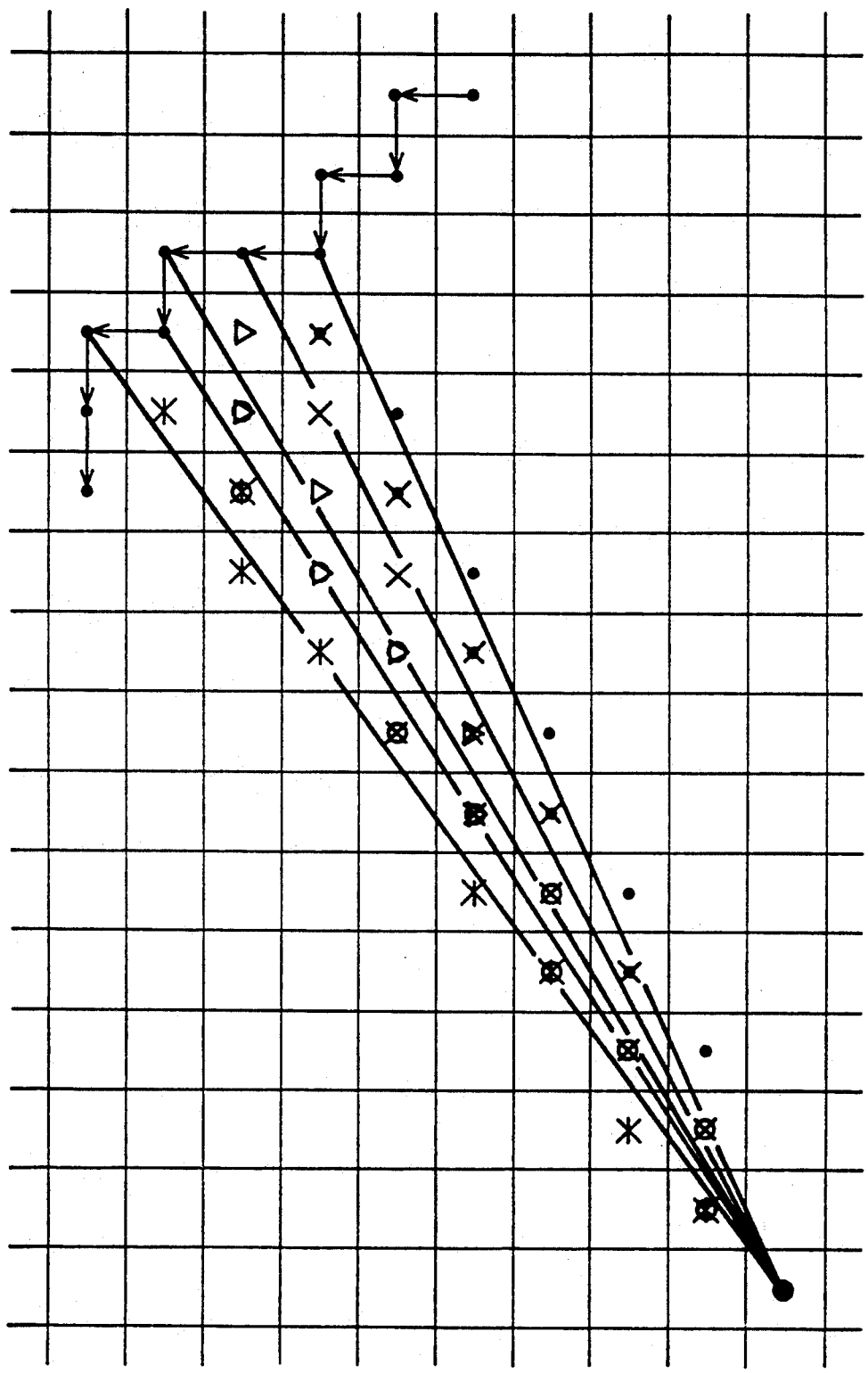
FIG. 32 is a view showing how filling is performed by a seventh embodiment of the invention using digital straight lines.
Figure 33:
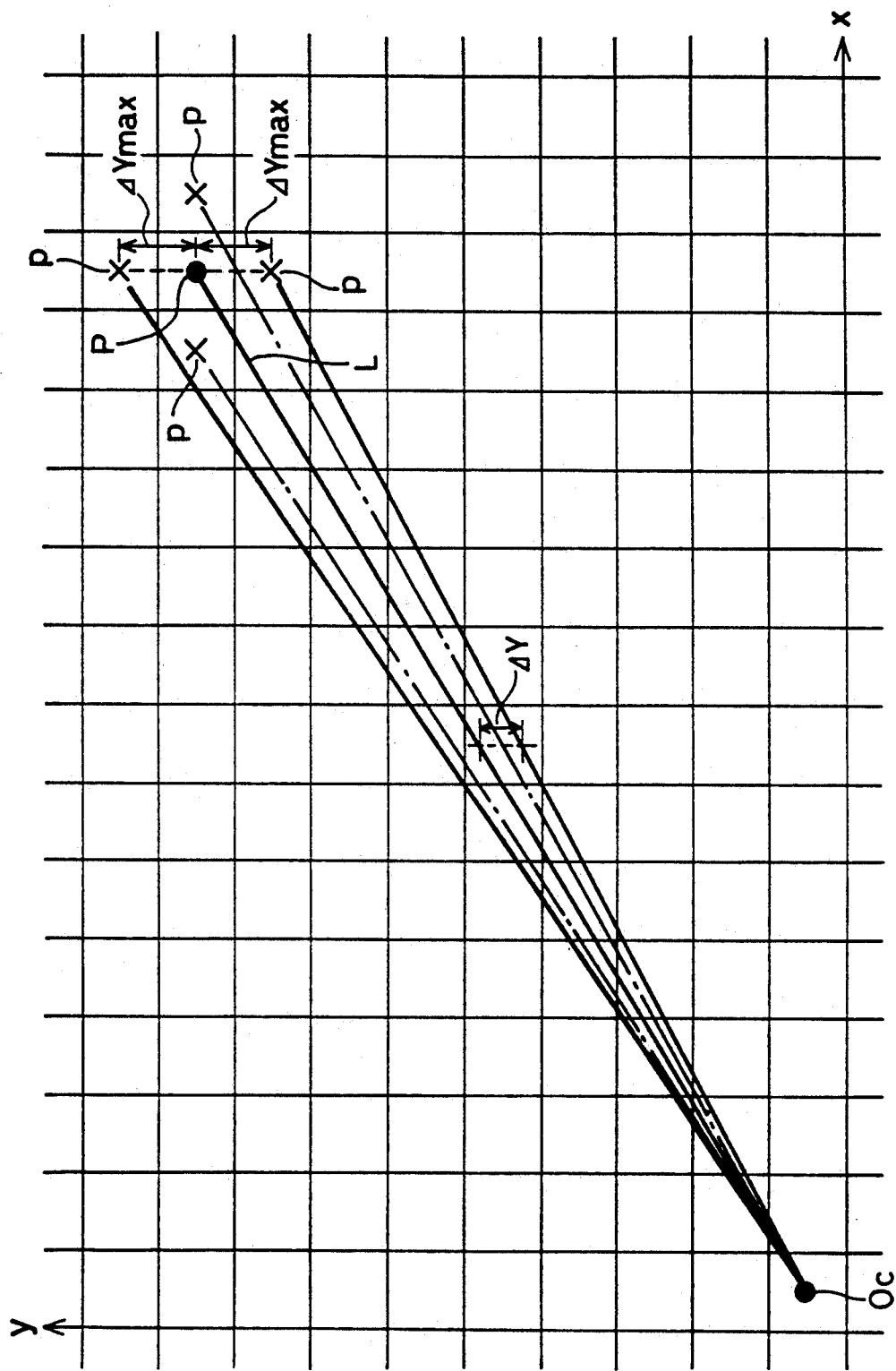
FIG. 33 is a view describing how no pixels are left unfilled by the seventh embodiment.

FIG. 32 depicts how filling is performed by the seventh embodiment using digital straight lines in the manner described above. As shown in FIG. 32, if the contour point sequence generating means 21 generates the coordinates of each contour point based on a contour point sequence comprising four points adjacently connected only in the upper, lower, left and right directions, there occur no pixels that would be left unfilled. As illustratively shown in FIG. 33, if there is a straight line L connecting the contour point P to the center of rotation Oc, along with a straight line connecting the center of rotation Oc to each of four points "p" adjacently connected to the contour point P, a relationship $$\Delta Y \leq \Delta Y_{max} \leq 1$$

exists, where $\Delta Y$ is the distance in the Y axis direction between line L and any of the other lines, and $\Delta Y_{max}$ is the maximum value of the Y axis distance $\Delta Y$. Therefore, no pixel is left unfilled when quantized between any two straight lines.

Figure 34:
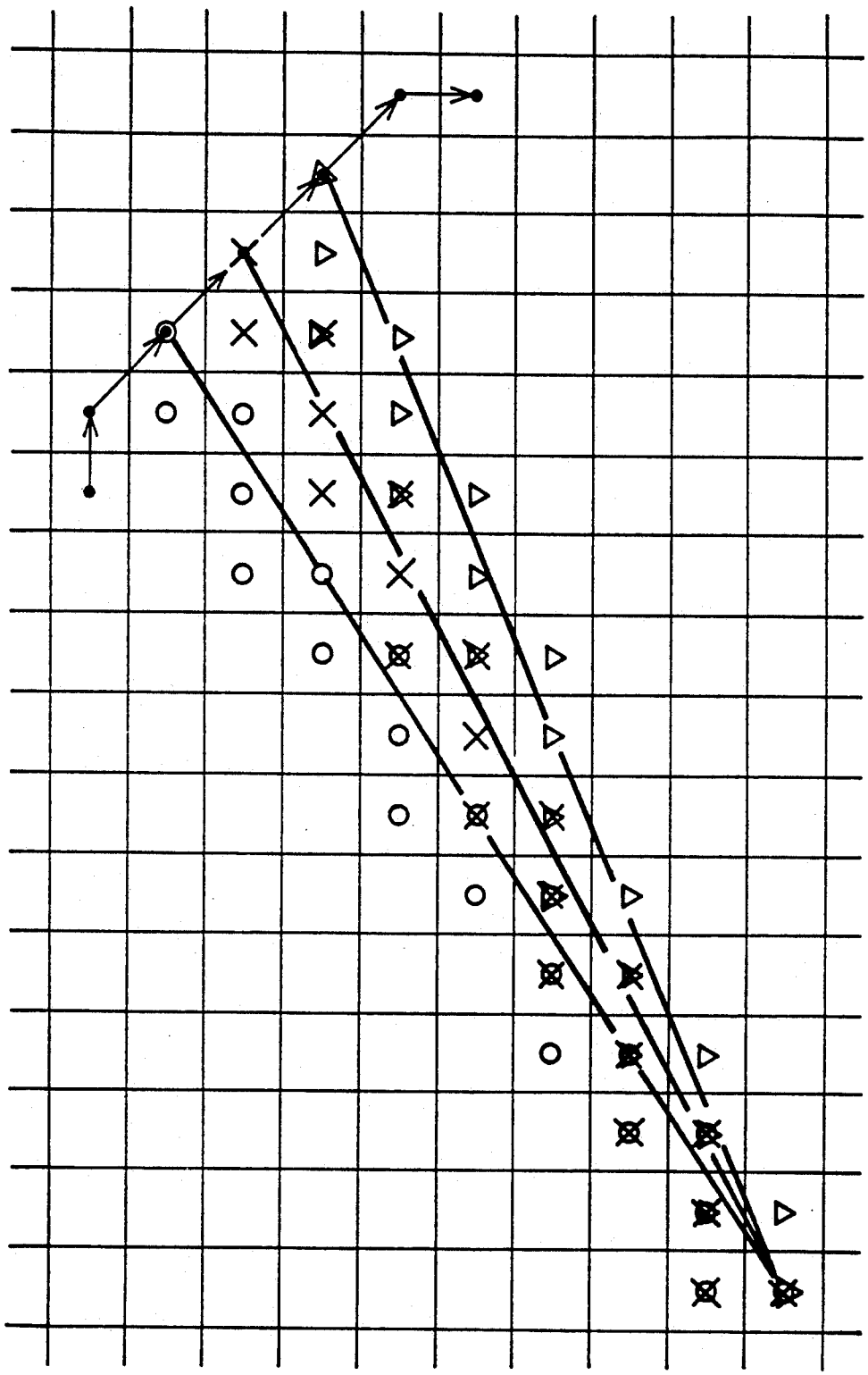
FIG. 34 is a view illustrating how filling is performed by an eighth embodiment of the invention using digital straight lines.
Figure 35:
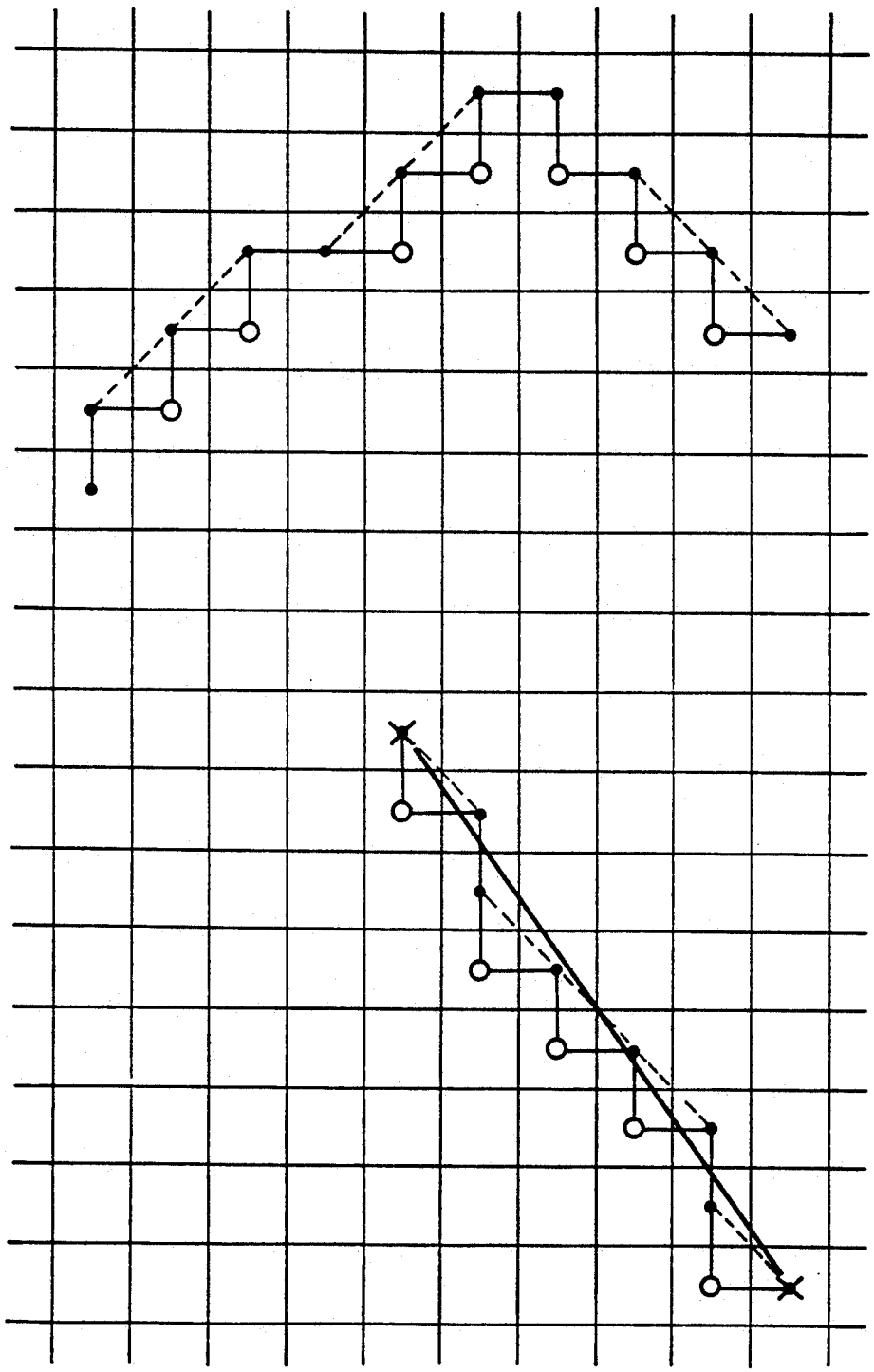
FIG. 35 is a view depicting how a point sequence constituted by eight adjacently connected points is converted into a point sequence made up of four adjacently connected points.

FIG. 34 depicts how filling is performed by the eighth embodiment of the invention using digital straight lines. In this case, the contour point sequence generating means 21 generates the coordinates of each contour point based on a contour point sequence comprising not four but eight adjacently connected points. The straight line drawing means 22 draws a digital straight line comprising four adjacently connected points between each contour point and the center of rotation.

Where a point sequence of eight adjacently connected points needs to be converted into a point sequence of four adjacently connected points and where the next point is located diagonally with respect to the eight-adjacent-point connection, as shown in FIG. 35, another adjacent point in the upper, lower, left or right direction need only be added to the right-hand side of the advance direction. Alternatively, a contour point sequence of four adjacently connected points or a digital straight line may be generated from the beginning, instead of taking the trouble to generate a contour point sequence of eight adjacently connected points or a digital straight line for conversion into a point sequence of four adjacently connected points. This alternative method may be implemented by use of known algorithms.

As described, through the use of the first embodiment of the invention, an interior-filled two-dimensional shape to be displayed is first drawn in the draft memory. Scan coordinates for specifying dots in the draft memory and the display frame memory are generated consecutively in accordance with a designated scan pattern. When a dot specified by scan coordinates in the draft memory is found to fall within the filled shape, the corresponding dot specified by the same scan coordinates is drawn in the display frame memory. Because it allows the filling process to be displayed in various scan patterns, this first embodiment may be practiced as a contour filling apparatus that provides information displays of enhanced visual effects. Such an apparatus may illustratively draw the audience's attention to a desired portion of the screen by filling it in a specific scan pattern.

Through the use of the second embodiment of the invention, an item of inner point sequence data is detected by the inner point sequence detecting means, the data item being in contact with the interior of closed contour point data which was converted by the point sequence converting means. Thereafter, more items of inner point sequence data are detected, the data items being in further contact with the interior of the inner point sequence data detected by the inner point sequence detecting means itself. The point sequence drawing means draws the detected inner point sequence data in the display frame memory. Capable of displaying the filling process from contour to center of the target shape, this second embodiment may also be practiced as a contour filling apparatus that provides information displays of enhanced visual effects.

Through the use of the third embodiment of the invention, any point that parts the detected inner point sequence data is detected. The discontinued inner point sequence data as parted by such parting points is connected to form a plurality of closed inner point sequence data. This third embodiment may be practiced as a contour filling apparatus that performs contour filling even if the inner point sequence data detected by the inner point sequence detecting means is discontinuous.

Through the use of the fourth embodiment of the invention, the detected inner point sequence data is stored temporarily in the inner point sequence storing means. The data is then read out consecutively from center to contour of the target shape for transmission to the point sequence drawing means. The point sequence drawing means draws the data upon receipt thereof in the display frame memory. This fourth embodiment displays the filling process from center to contour of the target shape.

The fifth embodiment of the invention is capable of addressing cases in which the inner point sequence data detected by the inner point sequence detecting means is discontinuous. This embodiment can also be practiced as a contour filling apparatus that provides information displays of pronounced visual effects.

Through the use of the sixth embodiment of the invention, the coordinates of each contour point along the contour point sequence of the shape to be displayed are generated consecutively. Each contour point is connected to the center of rotation inside the shape using a digital straight line that is drawn consecutively. Because it displays the filling process along the scan lines rotating around the center, this embodiment may also be practiced as a contour filling apparatus that provides information displays of improved visual effects.

The seventh embodiment of the invention makes it possible, where a digital straight line is drawn using eight adjacently connected points, to generate the coordinates of each contour point along the contour point sequence using four adjacently connected points. Furthermore, the eighth embodiment of the invention makes it possible, where the coordinates of each contour point along the contour point sequence are generated using eight adjacently connected points, to draw a digital straight line using four adjacently connected points. These embodiments may be each practiced as a contour filling apparatus that does not leave any pixels unfilled within the target shape during the filling process.

It is to be understood that while the invention has been described in conjunction with specific embodiments, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. A contour filling apparatus comprising:
 a storage device for storing graphic data about a target shape to be displayed on a display device;
 a display frame memory for storing said target shape in bit-map format;
 a draft memory corresponding to said display frame memory in terms of storage space; and
 a drawing controller operably connected to said storage device, said draft memory and said display frame memory, further comprising:
 a draft filling means for filling said target shape in said draft memory according to a predetermined draft scan pattern based on contour information contained in said graphic data which is read from said storage device, said draft filling means thereby drawing a two-dimensional shape in said draft memory;
 a scan coordinate generating means for generating scan coordinates specifying a dot in said draft memory and said display frame memory, said generating of coordinates being performed based on a scan pattern selected from a plurality of previously provided scan patterns;
 a scan coordinate determining means for checking to see if the dot specified by said scan coordinates in said draft memory is a dot that has been filled by said draft filling means; and
 a dot drawing means, if said dot specified by said scan coordinates in said draft memory is found to be a dot that has been filled by said draft filling means, for drawing said dot specified by said scan coordinates in said display frame memory.

2. A contour filling apparatus comprising:

a display frame memory for storing a target shape to be displayed on a display device in bit-map format; and a drawing controller further comprising:

a point sequence converting means for converting a contour of said target shape to be displayed on said display device into closed contour point sequence data;

an inner point sequence detecting means for first receiving, as outer point sequence data, said contour point sequence data converted by said point sequence converting means, said inner point sequence detecting means including means for detecting inner point sequence data which is in contact with points interior to said outer point sequence data, means for receiving as outer point sequence data said inner point sequence data detected by said detecting means itself, and means for detecting inner point sequence data which is in contact with points interior to said outer point sequence data detected by said detecting means itself; and a point sequence drawing means for drawing in said display frame memory the inner point sequence data detected by said inner point sequence detecting means.

3. A contour filling apparatus comprising:

a display frame memory for storing a target shape to be displayed on a display device in bit-map format; and a drawing controller further comprising:

a point sequence converting means for converting a contour of said target shape to be displayed on said display device into closed contour point sequence data;

an inner point sequence detecting means for first receiving, as outer point sequence data, said contour point sequence data converted by said point sequence converting means, said inner point sequence detecting means detecting inner point sequence data which is in contact with points interior to said outer point sequence data, said inner point sequence detecting means further receiving as outer point sequence data said inner point sequence data detected by said detecting means itself, said inner point sequence detecting means further detecting inner point sequence data which is in contact with said outer point sequence data detected by said detecting means;

a parting point detecting means for detecting any point that parts a discontinuous portion of said inner point sequence data upon detection of a discontinuity of said inner point sequence data by said inner point sequence detecting means;

a point sequence part connecting means for connecting, into a plurality of closed inner point sequence data, discontinuous inner point sequence data parted by the parting points detected by said parting point detecting means; and a point sequence drawing means for drawing in said display frame memory the inner point sequence data detected by said inner point sequence detecting means.

4. A contour filling apparatus comprising:

a display frame memory for storing a target shape to be displayed on a display device in bit-map format; and a drawing controller further comprising:

a point sequence converting means for converting the contour of said target shape to be displayed on said display device into closed contour point sequence data;

an inner point sequence detecting means including means for first receiving, as outer point sequence data, said closed contour point sequence data converted by said point sequence converting means, means for detecting inner point sequence data which is in contact with the interior of said outer point sequence data, means for receiving as outer point sequence data said inner point sequence data detected by said detecting means itself, and means for detecting inner point sequence data which is in contact with said detecting-means-detected outer point sequence data;

an inner point sequence storing means for consecutively storing said inner point sequence data detected by said inner point sequence detecting means;

an inner point sequence reading means, after all said inner point sequence data is detected and stored into said inner point sequence storing means, for consecutively reading out said inner point sequence data from said inner point sequence storing means from center to contour of said target shape; and a point sequence drawing means for drawing in said display frame memory said inner point sequence data in an order in which said data was read out by said inner point sequence reading means.

5. A contour filling apparatus comprising:

a display frame memory for storing a target shape to be displayed on a display device in bit-map format; and a drawing controller further comprising:

a point sequence converting means for converting the contour of said target shape to be displayed on said display device into closed contour point sequence data;

an inner point sequence detecting means for first receiving, as outer point sequence data, said contour point sequence data converted by said point sequence converting means, said inner point sequence detecting means detecting inner point sequence data which is in contact with the interior of said outer point sequence data, said inner point sequence detecting means further receiving as outer point sequence data said inner point sequence data detected by said detecting means itself, said inner point sequence detecting means further detecting inner point sequence data which is in contact with said detecting-means-detected outer point sequence data;

a parting point detecting means for detecting any point that parts a discontinuous portion of said inner point sequence data upon detection of a discontinuity of said inner point sequence data by said inner point detecting means;

a point sequence part connecting means for connecting, into a plurality of closed inner point sequence data, discontinuous inner point sequence data as parted by the parting points detected by said parting point detecting means;

an inner point sequence storing means for consecutively storing said inner point sequence data detected by said inner point sequence detecting means;

an inner point sequence reading means, after all said inner point sequence data is detected and stored into said inner point sequence storing means, for consecutively reading out said inner point sequence data from said inner point sequence storing means from center to contour of said target shape; and a point sequence drawing means for drawing in said display frame memory said inner point sequence data in a predetermined order in which said data was read out by said inner point sequence reading means.

6. A contour filling apparatus comprising:

a display frame memory for storing a convex-contoured target shape to be displayed on a display device in bit-map format; and a drawing controller further comprising:

a contour point sequence generating means for consecutively generating coordinates of a plurality of contour points along the contour point sequence of said convex-contoured target shape; and a straight line drawing means for connecting with a straight line each of said contour points generated by said contour point sequence generating means to a center of rotation set inside said convex-contoured target shape, said straight line drawing means quantizing said straight line into a digital straight line using a predetermined algorithm, said straight line drawing means drawing said digital straight line in said display frame memory.

7. A contour filling apparatus comprising:

a display frame memory for storing a convex-contoured target shape to be displayed on a display device in bit-map format; and a drawing controller further comprising:

a contour point sequence generating means for consecutively generating coordinates of each contour point along a contour point sequence of said convex-contoured target shape, said contour point sequence containing four adjacently connected points; and a straight line drawing means for connecting with a straight line said contour point sequence generated by said contour point sequence generating means to the center of rotation set inside said convex-contoured target shape, said straight line drawing means quantizing said straight line into a digital straight line containing eight adjacently connected points using a predetermined algorithm, said straight line drawing means drawing said digital straight line in said display frame memory.

8. A contour filling apparatus comprising:

a display frame memory for storing a convex-contoured target shape to be displayed on a display device in bit-map format; and a drawing controller further comprising:

a contour point sequence generating means for consecutively generating coordinates of each contour point along a contour point sequence of said convex-contoured target shape, said contour point sequence containing eight adjacently connected points; and a straight line drawing means for connecting with a straight line said contour point generated by said contour point sequence generating means to the center of rotation set inside said convex-contoured target shape, said straight line drawing means quantizing said straight line into a digital straight line containing four adjacently connected points using an appropriate algorithm, said straight line drawing means drawing said digital straight line in said display frame memory.

* * * * *

UNITED STATES PATENT AND TRADEMARK OFFICE
CERTIFICATE OF CORRECTION

PATENT NO. : 5,271,093
DATED : December 14, 1993
INVENTOR(S) : Toshihiko Hata et al.

It is certified that error appears in the above-indentified patent and that said Letters Patent is hereby corrected as shown below:

Column 3, line 55, "5(-d)" should read --5(a-d)--

Signed and Sealed this

Twenty-fourth Day of May, 1994

Attest:

BRUCE LEHMAN

*Attesting Officer*  *Commissioner of Patents and Trademarks*